United States Patent [19]
Itoh et al.

[11] Patent Number: 5,812,907
[45] Date of Patent: Sep. 22, 1998

[54] IMAGE PROCESSING APPARATUS WHICH CAN INTERRUPT A CURRENT JOB TO EXECUTE ANOTHER JOB

[75] Inventors: Akio Itoh, Machida; Yoshihiko Suzuki, Tokyo; Shokyo Koh, Kawasaki; Hirohiko Tashiro, Yokohama; Akinobu Nishikata, Fujisawa, all of Japan

[73] Assignee: Canon Kabushiki Kaisha, Tokyo, Japan

[21] Appl. No.: 659,050

[22] Filed: Jun. 3, 1996

Related U.S. Application Data

[63] Continuation of Ser. No. 517,819, Aug. 22, 1995, abandoned.

[30] Foreign Application Priority Data

Aug. 31, 1994 [JP] Japan .................................. 6-206793

[51] Int. Cl.[6] .............................................. G03G 21/00
[52] U.S. Cl. ........................................... 399/87; 399/402
[58] Field of Search ............................. 399/402, 87, 82, 399/38, 9, 19

[56] References Cited

U.S. PATENT DOCUMENTS

| | | | |
|---|---|---|---|
| 4,708,461 | 11/1987 | Okuda et al. | 399/87 |
| 4,956,667 | 9/1990 | Gartner | 399/87 |
| 4,975,738 | 12/1990 | Senma et al. | 355/314 X |
| 5,170,397 | 12/1992 | Hurtz et al. | 355/204 X |
| 5,216,464 | 6/1993 | Kotani et al. | 355/204 X |
| 5,245,368 | 9/1993 | Farrell et al. | 399/87 |
| 5,341,203 | 8/1994 | Tokutsu | 399/87 |
| 5,384,633 | 1/1995 | Boyd | 355/314 |
| 5,495,314 | 2/1996 | Kikuchi et al. | 355/204 |

*Primary Examiner*—R. L. Moses
*Attorney, Agent, or Firm*—Fitzpatrick, Cella, Harper & Scinto

[57] ABSTRACT

An image processing apparatus includes a first processor for outputting first image data and a second processor for outputting second image data different from the first image data. The apparatus also includes a first detector for detecting a processing stage of the first processor and a second detector for detecting a processing condition of the second processing means. The apparatus also includes means for judging whether operations, to interrupt the processing by the first processor and to execute the processing by the second processor, are permitted or inhibited on the basis of a first detection result of the first detector and a second detection result of the second detector.

45 Claims, 19 Drawing Sheets

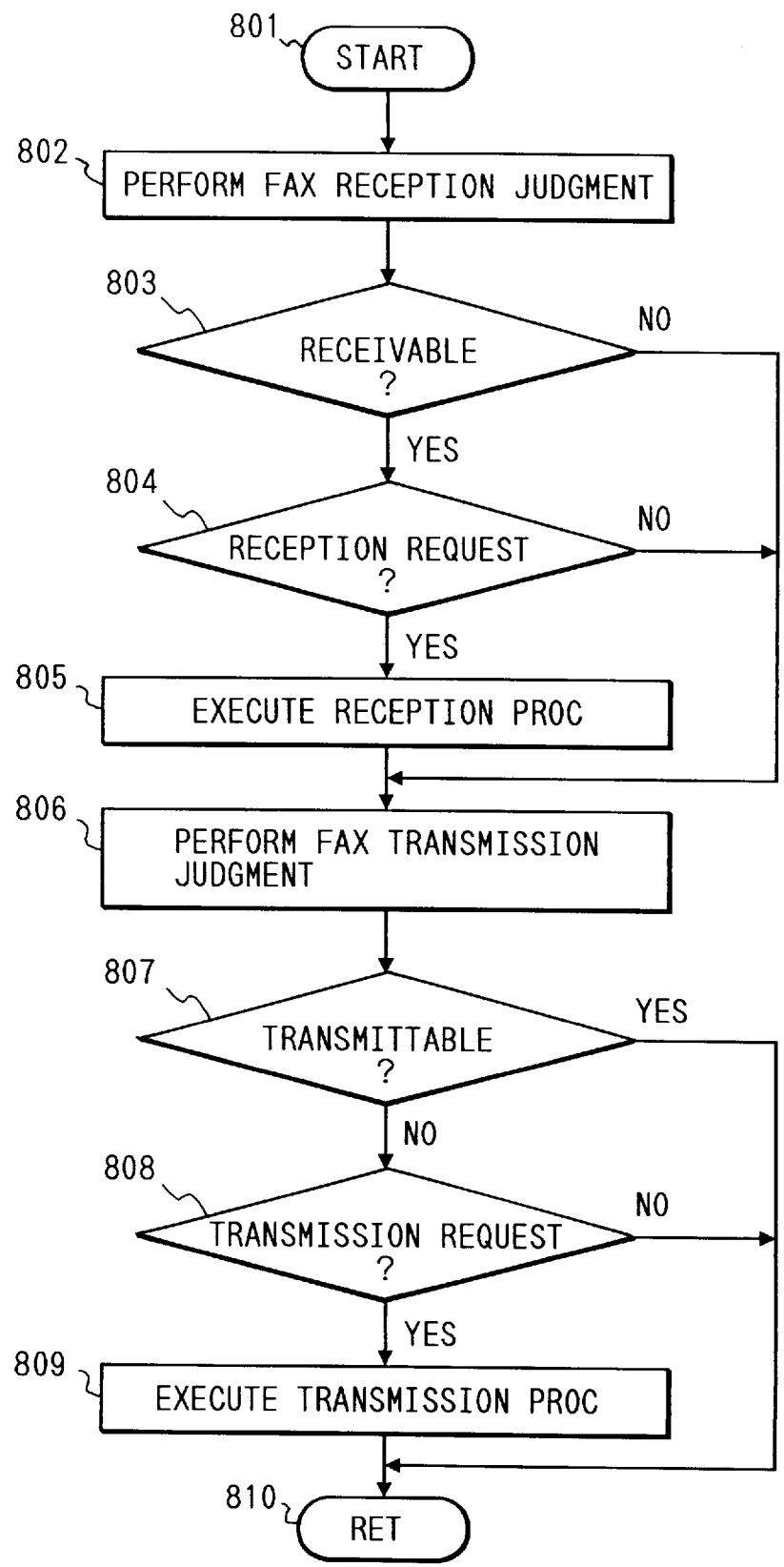

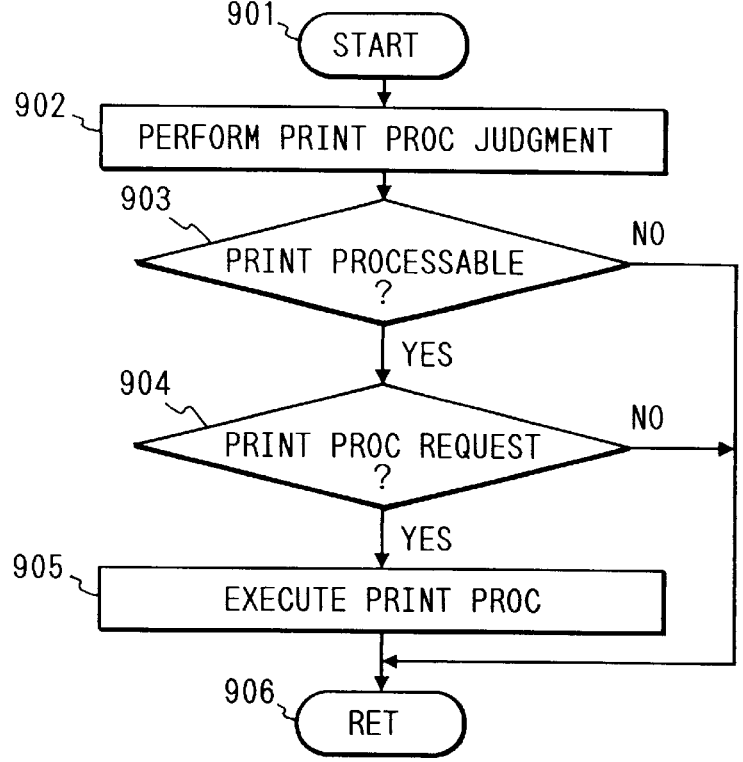
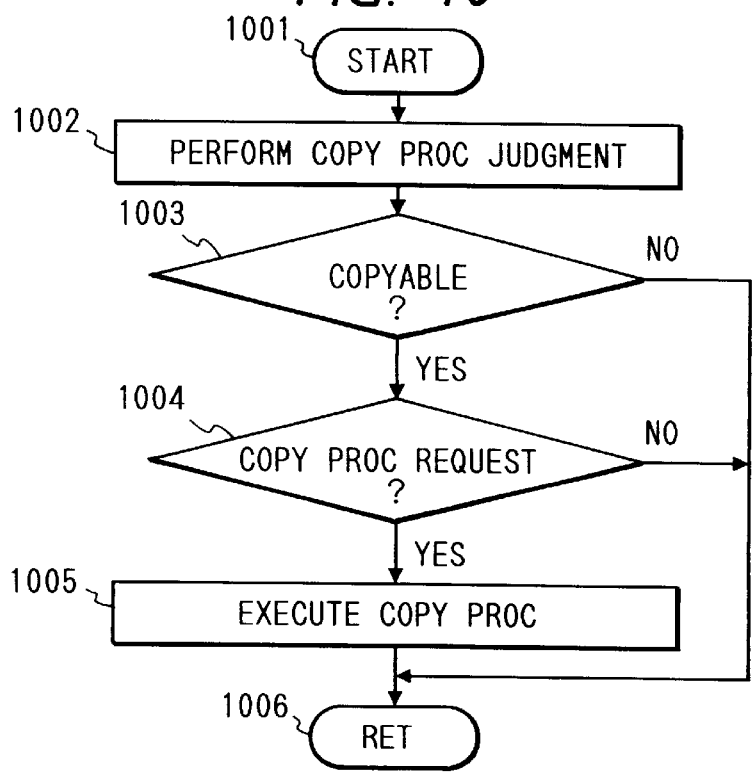

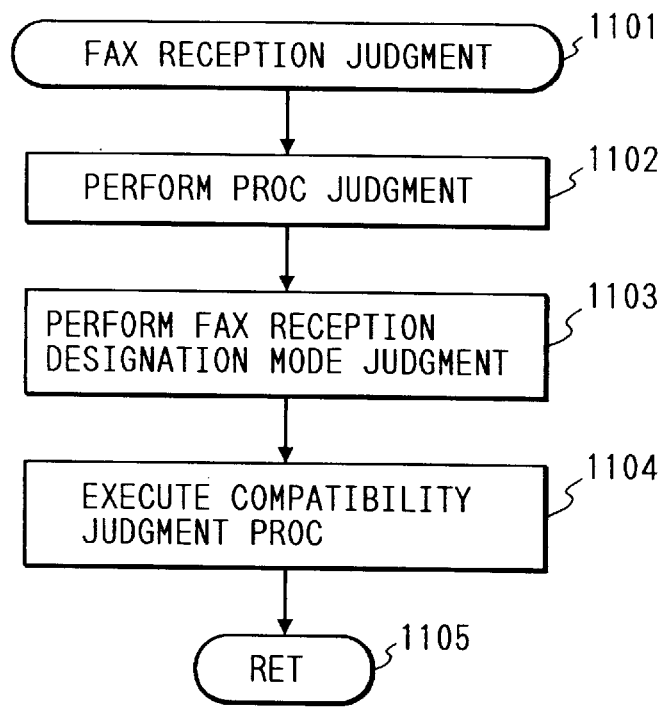
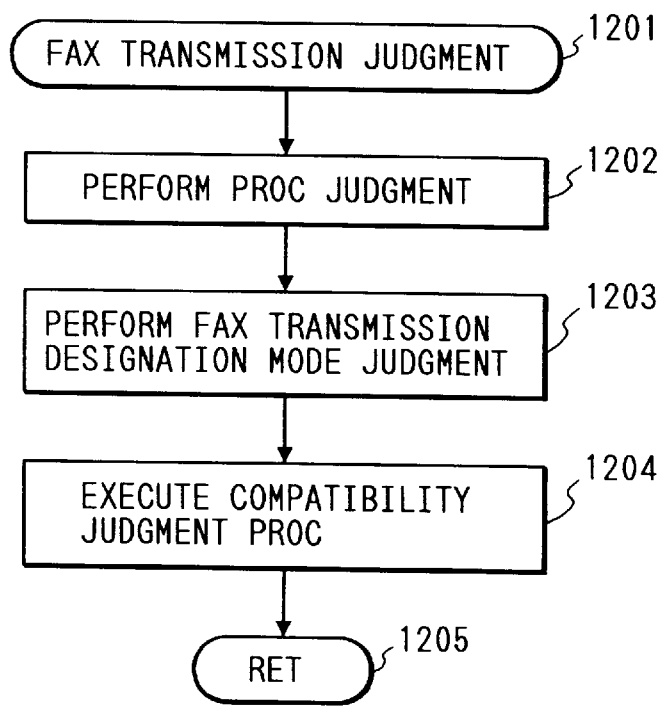

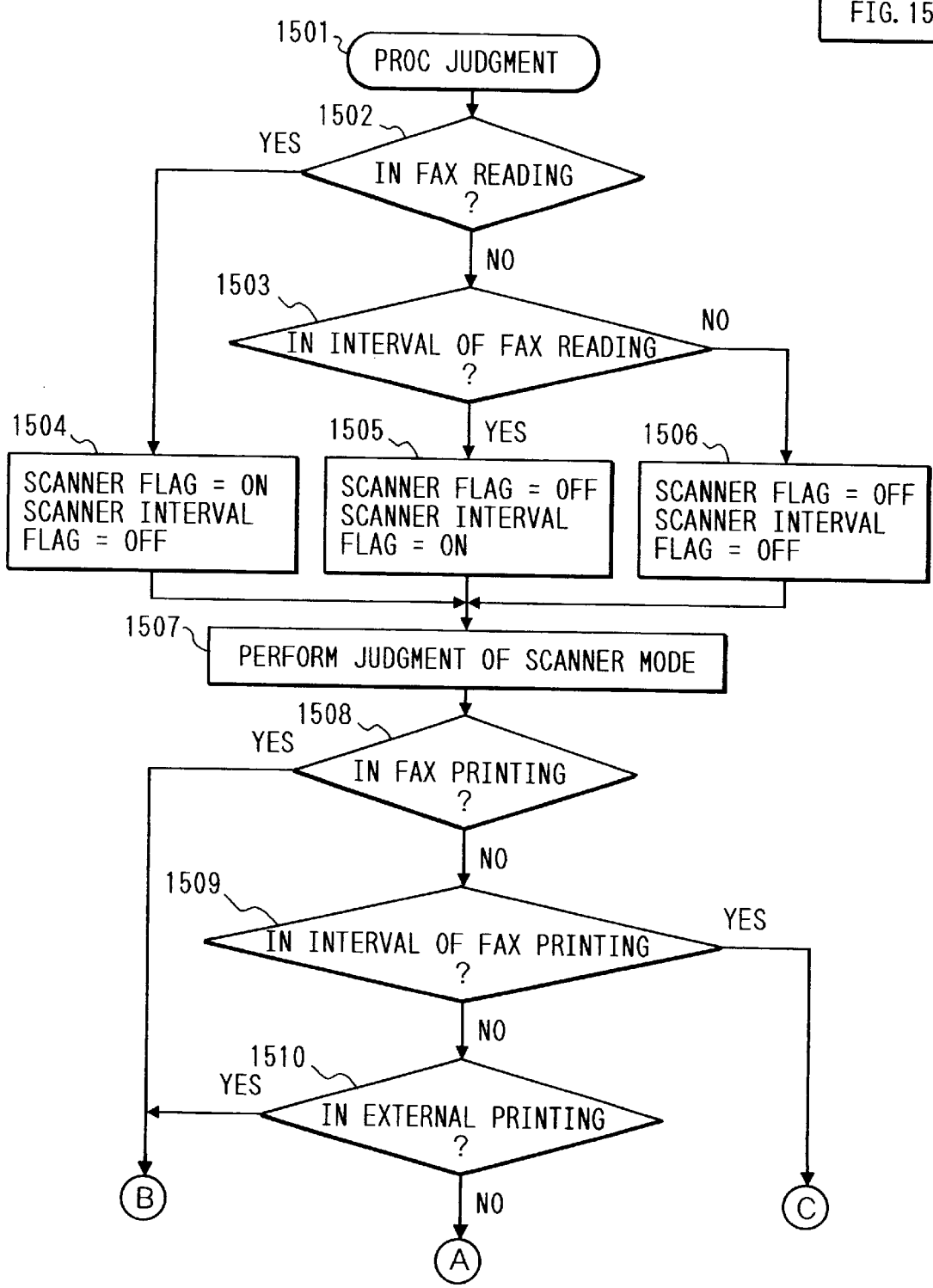

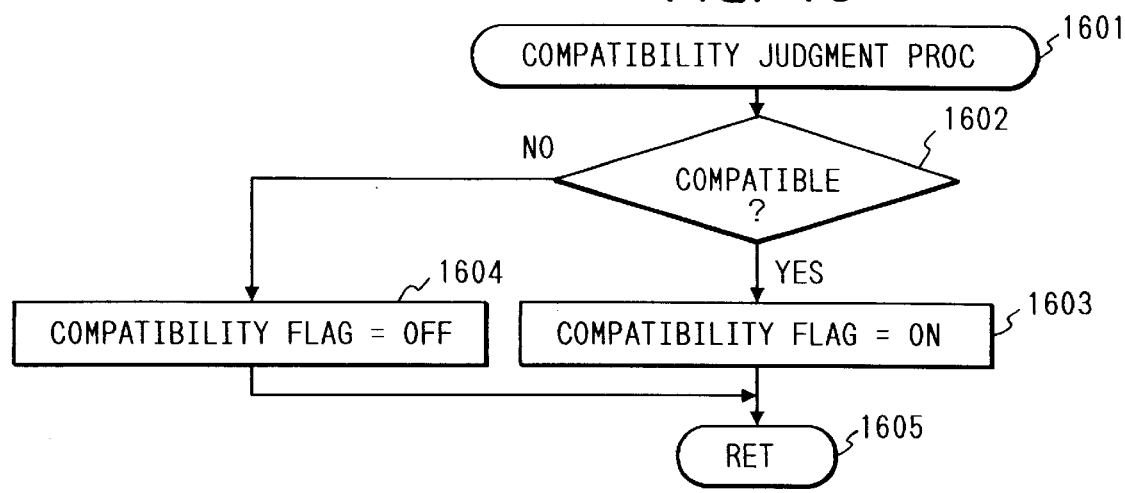
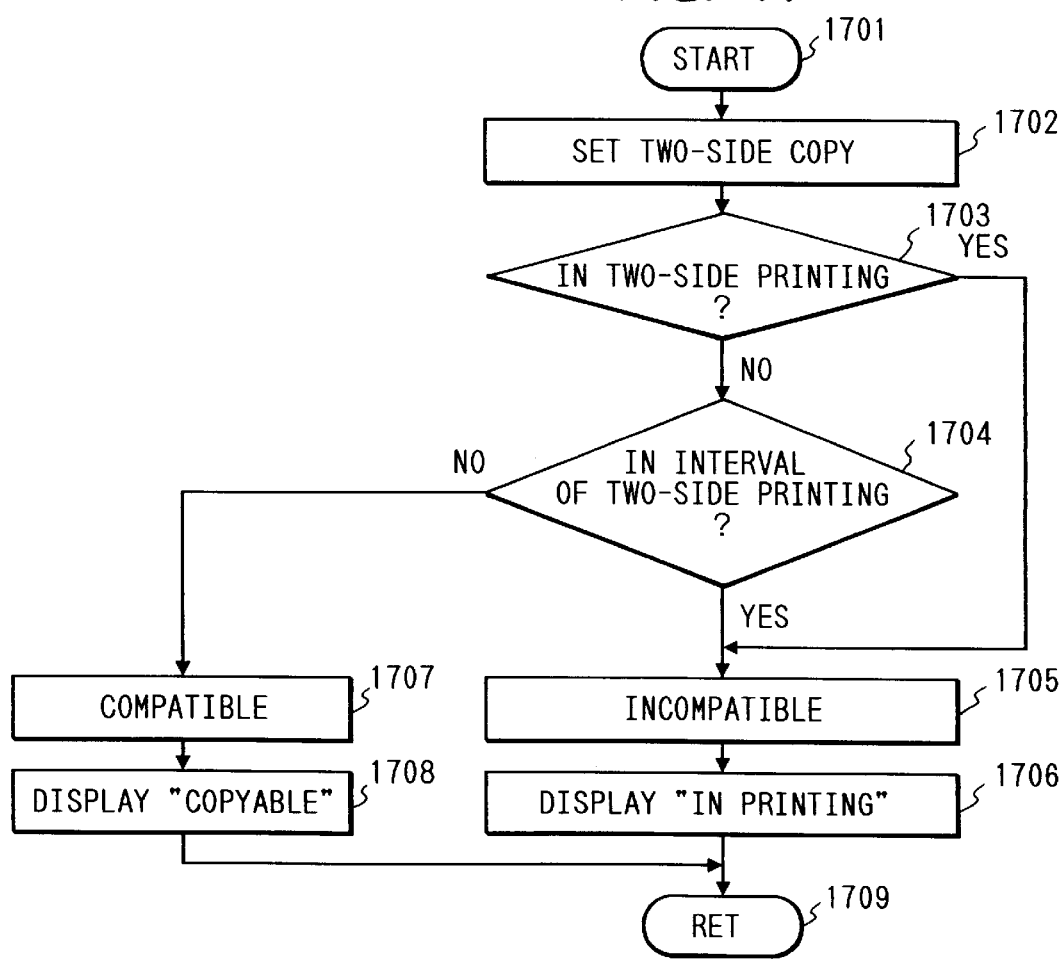

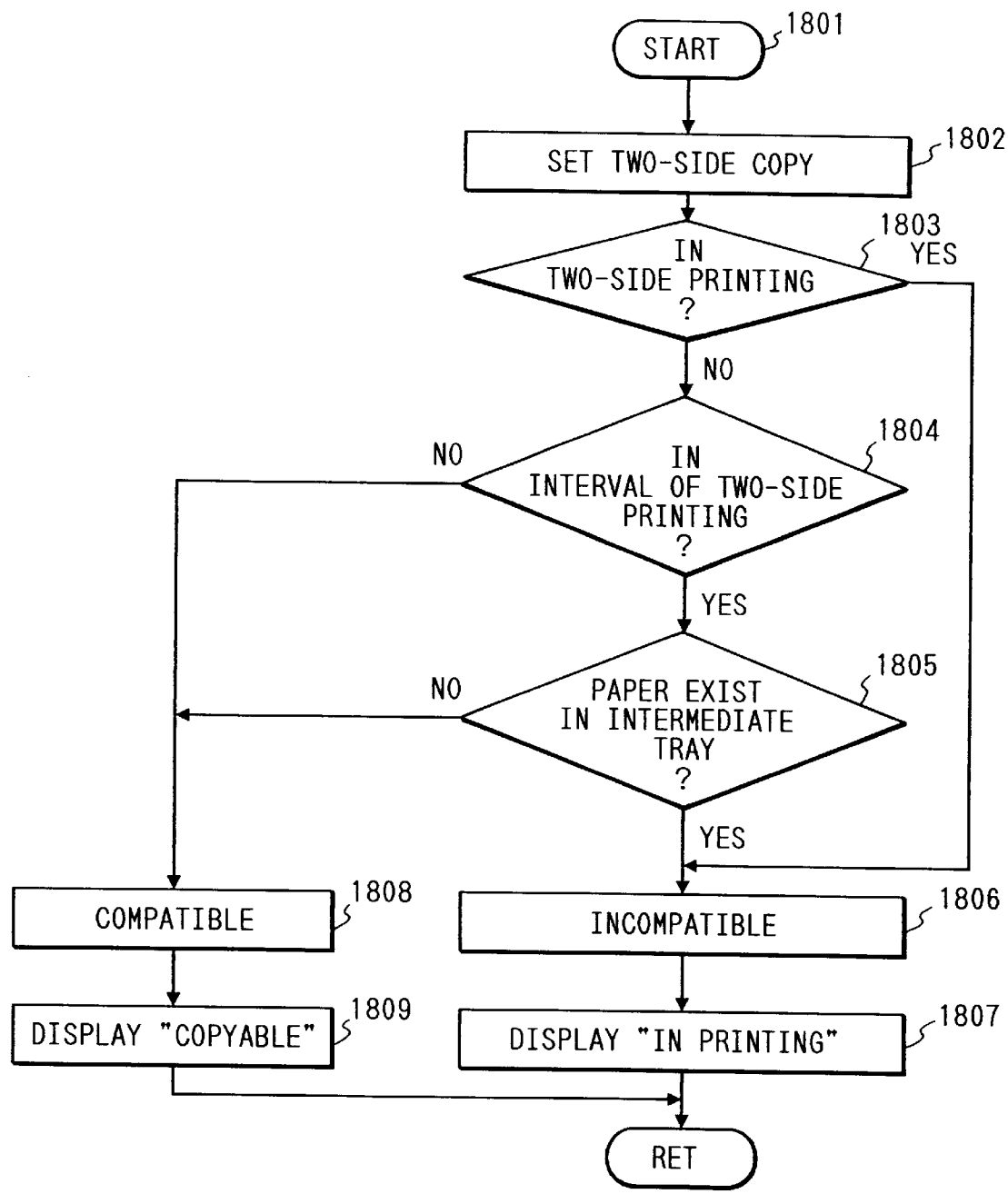

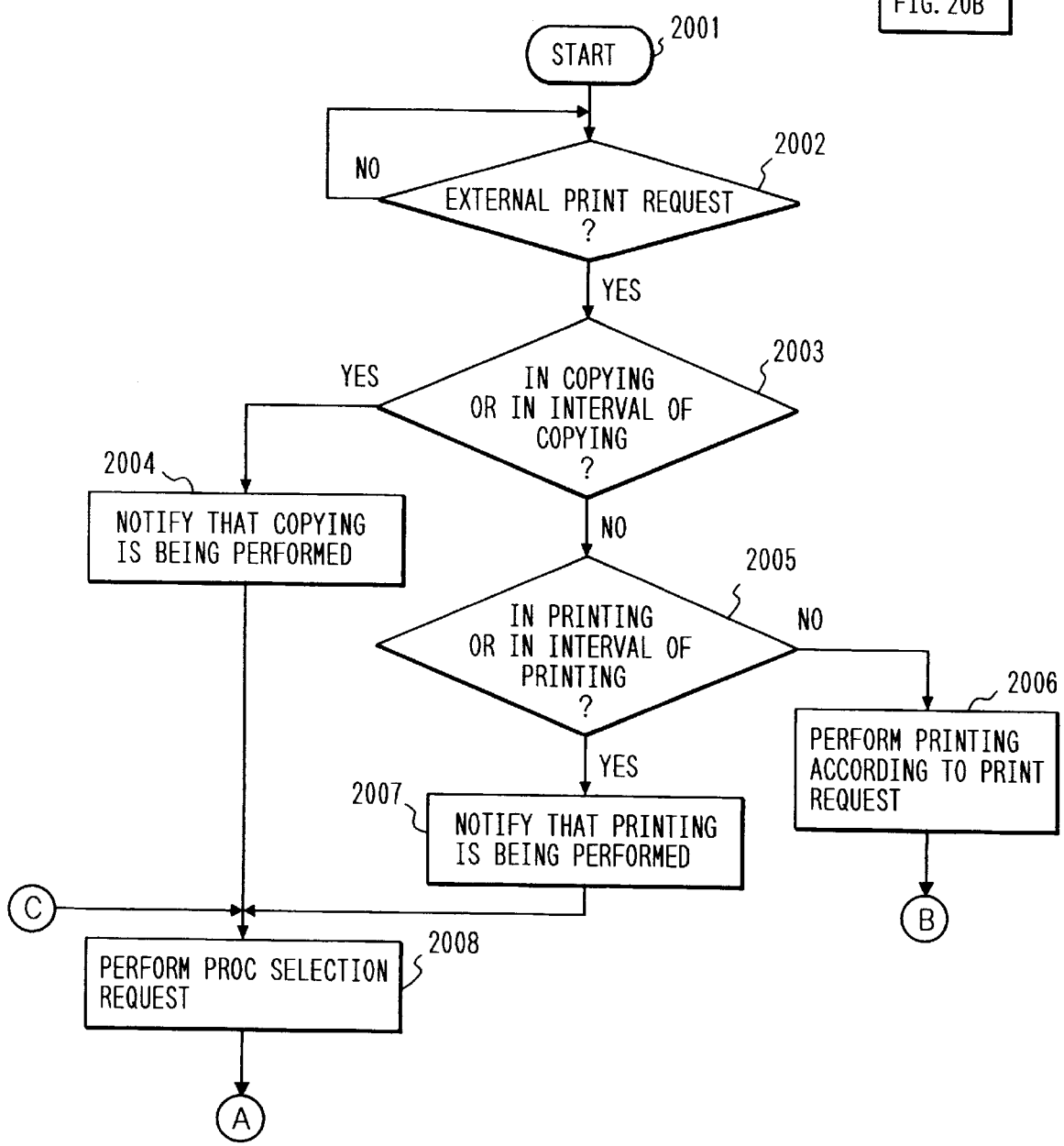

IMAGE PROCESSING APPARATUS WHICH CAN INTERRUPT A CURRENT JOB TO EXECUTE ANOTHER JOB

This application is a continuation of application Ser. No. 08/517,819 filed Aug. 22, 1995, now abandoned.

BACKGROUND OF THE INVENTION

1. Field of the Invention

The invention relates to an image processing apparatus for processing image data and, more particularly, to an interruption of the process.

2. Related Background Art

In recent years, there exists a kind of apparatus, for example, a copying apparatus having a communicating function in which image data, which was read by using a scanner unit of the copying apparatus, can be transmitted or image data can be received through a line, or image data received from an external apparatus such as a computer or the like, through an external interface can be recorded by a printer unit of the copying apparatus.

When the functions of the copying apparatus are compounded, as mentioned above, a problem arises in that processes compete during the case where the user wants to copy in recording of reception data or the like. To eliminate this problem, an apparatuses exist, one of which has an interruption key and interrupts execution a process in executing after the interruption key is depressed and performs another process, and another which allocates a priority order to every process and decides to permit or an inhibit of the interruption thereof in accordance with the priority order.

When a two-side copy or a two-side print is being executed, in order to avoid mixed recording papers in an intermediate tray or the like, any interruption is not permitted.

However, in the conventional technique, since the interruption has no relation to the stage of execution of the current a process and the condition of the interrupting process, the following cases arise. Namely, depending on of the stage of execution of the current process and the condition of the interrupting process, there is a case where it is efficient to execute the interruption, or in spite of the fact that there is a case where it is efficient to interrupt, the interruption is nonetheless executed by a depression of an interruption key or in accordance with a priority order.

SUMMARY OF THE INVENTION

The invention is made to solve the above problems and it is an object of the invention to provide an image processing apparatus which can efficiently execute a plurality of processes.

Another object of the invention is to provide an image processing apparatus which can interrupt a process for printing to both sides of a sheet and can execute another process.

Another object of the invention is to provide an image processing apparatus which can efficiently perform an interruption from an external apparatus.

The above and other objects and features of the present invention will become apparent from the following detailed description and the appended claims with reference to the accompanying drawings.

BRIEF DESCRIPTION OF THE DRAWINGS

FIG. 8 is a diagram showing the details of a fax processing in step 702 in FIG. 7;

FIG. 9 is a diagram showing the details of a print processing in step 703 in FIG. 7;

FIG. 10 is a diagram showing the details of a copy processing in step 704 in FIG. 7;

FIG. 11 is a diagram showing the details of a fax reception judgment in step 802 in FIG. 8;

FIG. 12 is a diagram showing the details of a fax transmission judgment in step 806 in FIG. 8;

FIG. 16 is a diagram showing the details of a compatibility judgment processing in FIGS. 11 to 14;

FIGS. 17 and 18 are flowcharts each showing a flow to judge whether a set process can be interrupted or not from a situation of the process in executing and conditions of the set process;

DETAILED DESCRIPTION OF THE PREFERRED EMBODIMENTS

First Embodiment

An embodiment of the invention will now be described in detail hereinbelow with reference to the drawings.

Figure 22:
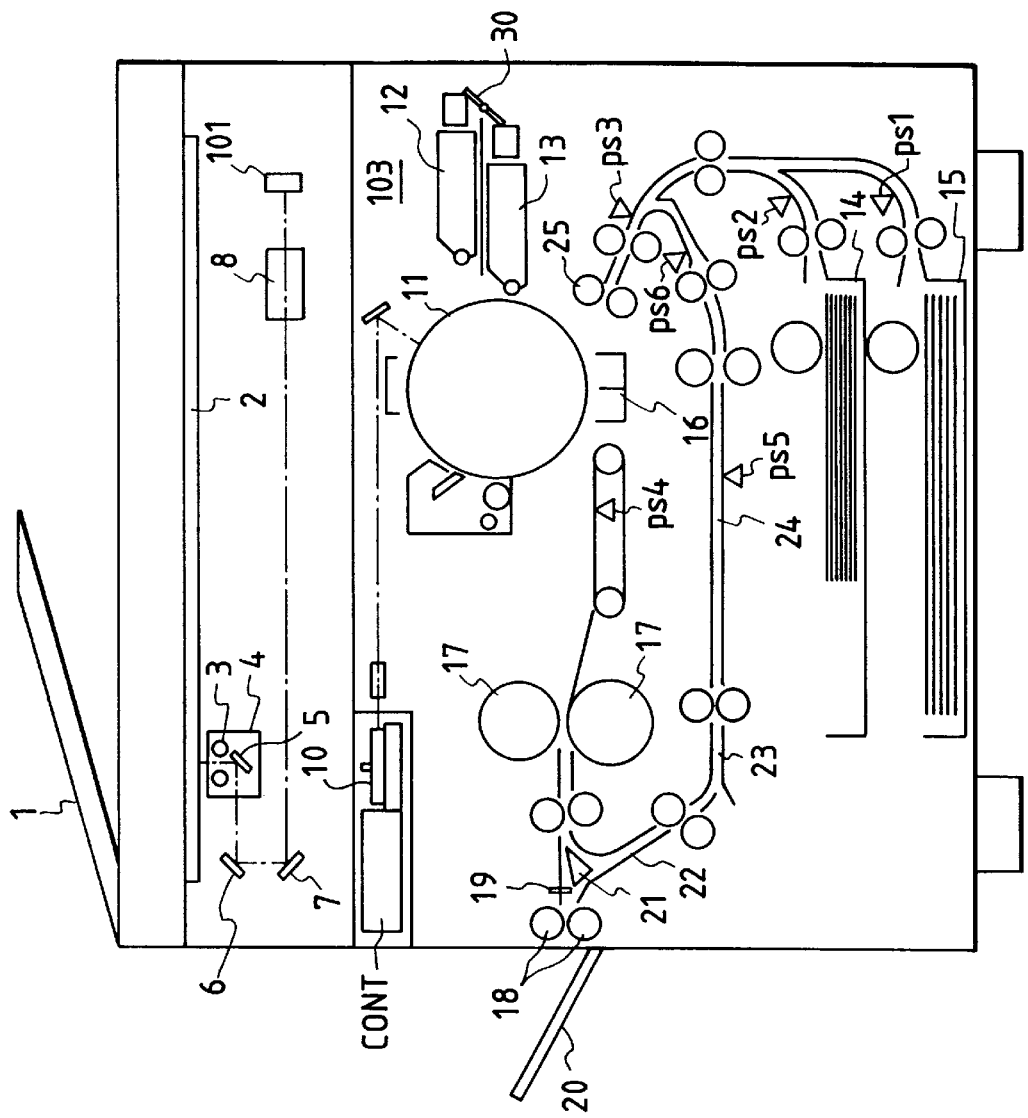
FIG. 22 is a cross sectional view of the copying apparatus as an embodiment of the invention.

FIG. 22 is a cross sectional view showing a construction of a copying apparatus as an embodiment of the invention.

In FIG. 22, reference numeral 1 denotes an automatic document feeder (hereinafter, also simply referred to as an ADF) for automatically feeding originals. The ADF 1 feeds the originals put thereon one by one or every papers continuously to a predetermined position on an original supporting glass plate 2. Reference numeral 4 indicates a scanner constructed by an exposing lamp 3 for irradiating the original, a scanning mirror 5 for exposing and scanning the original, and the like. After the original was put on the original supporting glass plate 2 by the document feeder 1, the scanner 4 is scanned in the direction of (A), thereby forming a reflection light from the original as an image onto a CCD 101 through scanning mirrors 5 to 7 and a lens 8. Reference numeral 10 denotes an exposure control unit which is constructed by a laser scanner. The exposure control unit 10 irradiates a light beam modulated on the basis of image data that is outputted from an image signal control unit of a controller unit CONT onto a photosensitive material 11. Reference numeral 12 denotes a red developing unit and 13 indicates a black developing unit. Each of the developing units visualizes an electrostatic latent image formed on the photosensitive material 11 by a predetermined developing agent (toner). Either one of the developing units 12 and 13 is located near the photosensitive drum 11 and another developing unit is located so as to be away from the photosensitive drum 11 by a developing unit switching device 30. In case of multiple developing, the controller unit CONT controls the developing unit switching device 30. Reference numerals 14 and 15 denote sheet stacking units in each which sheets of a regular size are enclosed. The sheet is fed from the sheet stacking unit 14 or 15 through a paper sensor ps1 or ps2 and a paper sensor ps3 to an arranging position of a resist roller 25 by the driving of a feed roller. The sheet is subsequently fed by the resist roller 25 at a timing such that a front edge of an image formed onto the photosensitive material 11 and a front edge of the sheet are matched.

Reference numeral 16 denotes a transfer & separation charging unit for transferring the toner image developed on the photosensitive material 11 and, after that, for separating the sheet from the photosensitive material 11, for confirming the separation by a separation sensor ps4, and for fixing the toner onto the sheet by a fixing unit 17 through a conveying belt; 18 a paper ejecting roller for ejecting the recorded sheet to a tray 20; and 21 a direction flapper for switching either one of a mode to eject out the recorded sheet to the tray 20 side and a mode to convey the sheet to internal conveying paths 22 and 23 and an intermediate tray 24.

In a two-side recording mode, the flapper 21 is lifted downward so as to eject the sheet on the tray 20 side. After the sheet passed through a paper ejection sensor 19, the paper ejecting roller 18 is rotated in the direction opposite to the paper ejecting direction. At the same time, the flapper 21 is lifted upward and the copied sheet is stored to the intermediate tray 24 through the conveying paths 22 and 23. The intermediate tray has a paper sensor ps5 for detecting the storage of the sheet. At the time of the back side recording which is subsequently executed, the sheet stored on the intermediate tray 24 is fed and the conveyance of the sheet is confirmed through a paper sensor ps6. The sheet is again fed to the transfer & separation unit, thereby performing the transfer onto the back surface of the sheet.

In a multiple recording mode, the flapper 21 is lifted upward and the recorded sheet is stored to the intermediate tray 24 through the conveying paths 22 and 23. At the time of the second recording that is executed next, the sheet stored on the intermediate tray 24 is fed, thereby performing the multiple transfer.

Figure 1:
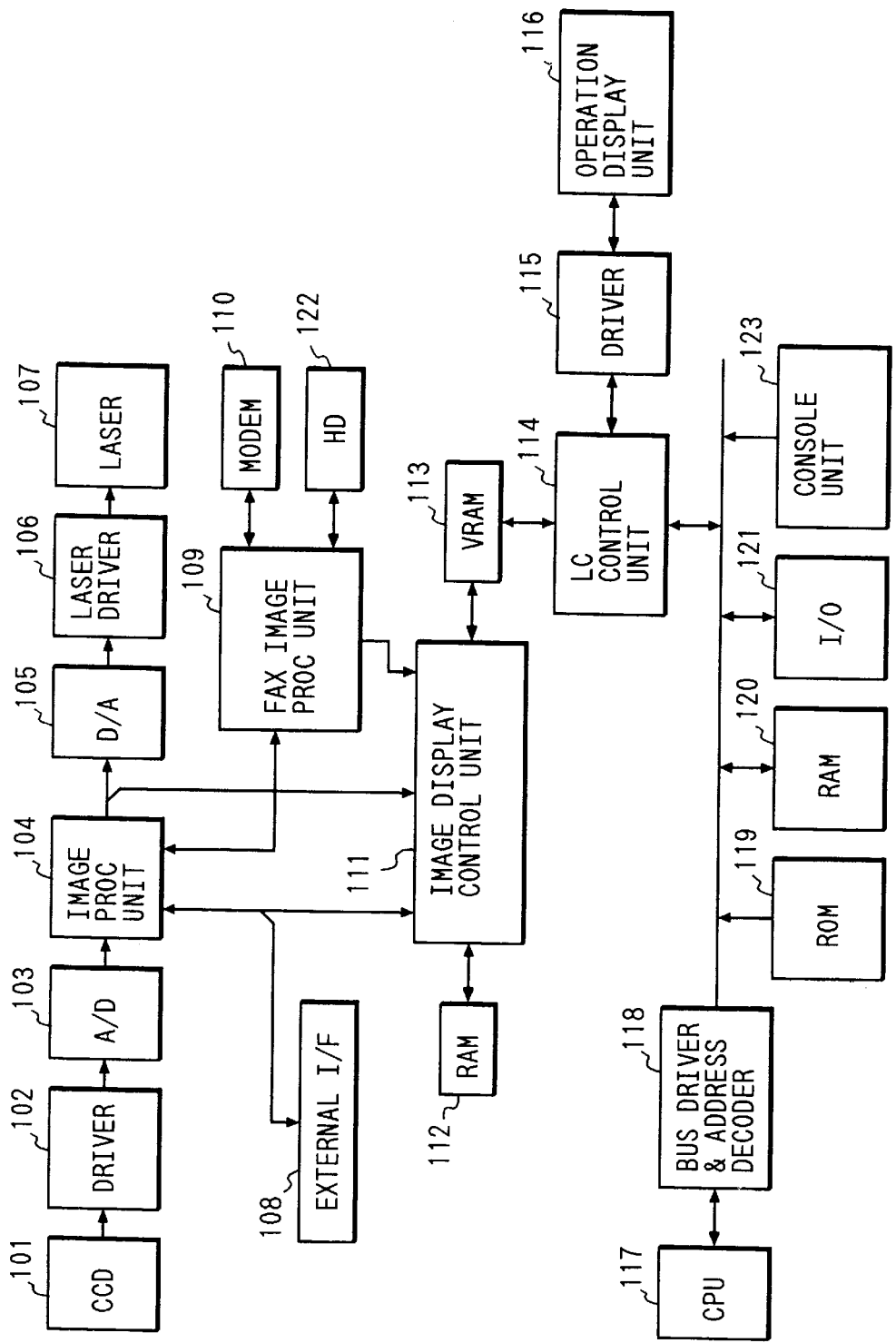
FIG. 1 is a block diagram of a copying apparatus as an embodiment of the invention.

A block diagram of the copying apparatus as an embodiment of the invention is shown in FIG. 1.

In FIG. 1, reference numeral 101 denotes the CCD as a read sensor for reading an original image. An output signal from the CCD 101 is driven by a driver 102. This signal is an analog signal and is converted to a digital signal of, for example, eight bits by an A/D converter 103. The image data converted to the digital signal by the A/D converter 103 is inputted to an image processing unit 104. The image processing unit 104 executes image processings such as shading correction for correcting a pixel variation of image data read by the CCD 101, zoom processing in the main scanning direction, edge emphasis processing which is used in a character mode, LOG conversion for converting luminance data to density data, and the like. The image data processed by the image processing unit 104 is inputted to a D/A converter 105 and is converted to analog data. Further, the analog data is converted to a signal for driving a laser 107 by a laser driver 106. The laser 107 can change an irradiation diameter in accordance with data from the laser driver 106 and can form an image by expressing light and dark states of a print output. Reference numeral 109 denotes a fax image processing unit for converting output data from the image processing unit 104 to data for a facsimile communication. Since binary data is used in the fax communication, in this instance, the image data of eight bits is converted from the luminance data to the density data and, after that, the density data is converted to binary data and is subjected to a rotation processing as necessary. The binary image data from the fax image processing unit 109 is transmitted to a modem (MODEM) 110 and is transmitted to a facsimile apparatus on the partner side by a communication line. In case of performing a memory transmission, the image data is compressed and stored to a hard disk (HD) 122. On the other hand, the reception data from the facsimile apparatus on the partner side is converted from the binary data to multivalue data of eight bits by a pattern matching by the fax image processing unit 109. The 8-bit multivalue data is enlarged as necessary and is transmitted to the image processing unit 104. In case of performing a memory reception, the image data is compressed in a manner similar to the case of the memory transmission before converting to the multivalue data and is stored to the hard disk 122. Subsequent processes are almost the same as those mentioned above and an image is formed by the laser 107.

Data from an external apparatus such as a computer or the like is transmitted to the image processing unit 104 through an external I/F circuit 108 as a driver/receiver circuit. Subsequent processes are also similar to those as mentioned above and an image is formed by the laser 107.

The image data obtained by reading the original by the CCD 101, the image data transmitted from the partner's facsimile apparatus, and the image data transmitted from the external device through the external I/F circuit 108 are inputted to an image display control unit 111 so as to be displayed by an operation display unit 116, respectively. Either one of the inputted image data is selected by the operation display unit 116 and is once stored in a readable/writable memory (RAM) 112. The image data stored in the RAM 112 is subjected to a thin processing and a rotation processing in accordance with a size of original or the like by the image display control unit 111 and is written to a memory (VRAM) for display 113 corresponding to a dot size of a liquid crystal display. The data in the VRAM 113 is transmitted to a liquid crystal (LC) control unit 114 by an instruction from a CPU 117 and is transmitted to the operation display unit 116 via a driver 115 for driving a liquid crystal and is displayed. Reference numeral 117 denotes the CPU for sequentially executing a control of the whole image processing apparatus in accordance with a control program stored in an ROM 119. An address bus and a data bus of the CPU 117 are connected to loads via a bus driver & address decoder 118, respectively. Reference numeral 119 denotes the read only memory (ROM) in which the control program has been stored; 120 a random access memory (RAM) as a main storage device which stores input data or which is used as a work memory area or the like; and 121 an I/O interface which is connected to loads of apparatuses such as sensors, motor, switch, and the like. The CPU 117 further sends various kinds of commands to the image processing unit 104, image display control unit 111, and fax image processing unit 109 and controls them.

The image display control unit 111 is connected to the image processing unit 104, external I/F circuit 108, and fax image processing unit 109 by the data bus and can receive image information from those units.

The operation display unit 116 is constructed as a touch panel type of liquid crystal. When the copy mode is selected, the operation display unit 116 performs a display to set various kinds of expansion functions which can be used upon copying, the image processing, environmental setting, and the like. When a desired function is selected on the touch panel by seeing the display contents, the display is sequentially switched so as to set more specifically. The selected processing contents can be also simultaneously displayed. When the fax mode is selected, the operation display unit 116 also similarly displays to set in the fax mode. In case of displaying the image information, the operation display unit 116 first displays a displayable range and a whole range can be confirmed by scrolling the range by the operation of the operator. When there are images of a plurality of pages, the images can be displayed by sequentially switching the pages.

The operation display unit 116 can also display a file list in the memory.

A console unit 123 is constructed by hard keys, namely, a start key and a stop key for copying or facsimile transmission, a ten-key for inputting information of a destination, and the like.

Figure 2:
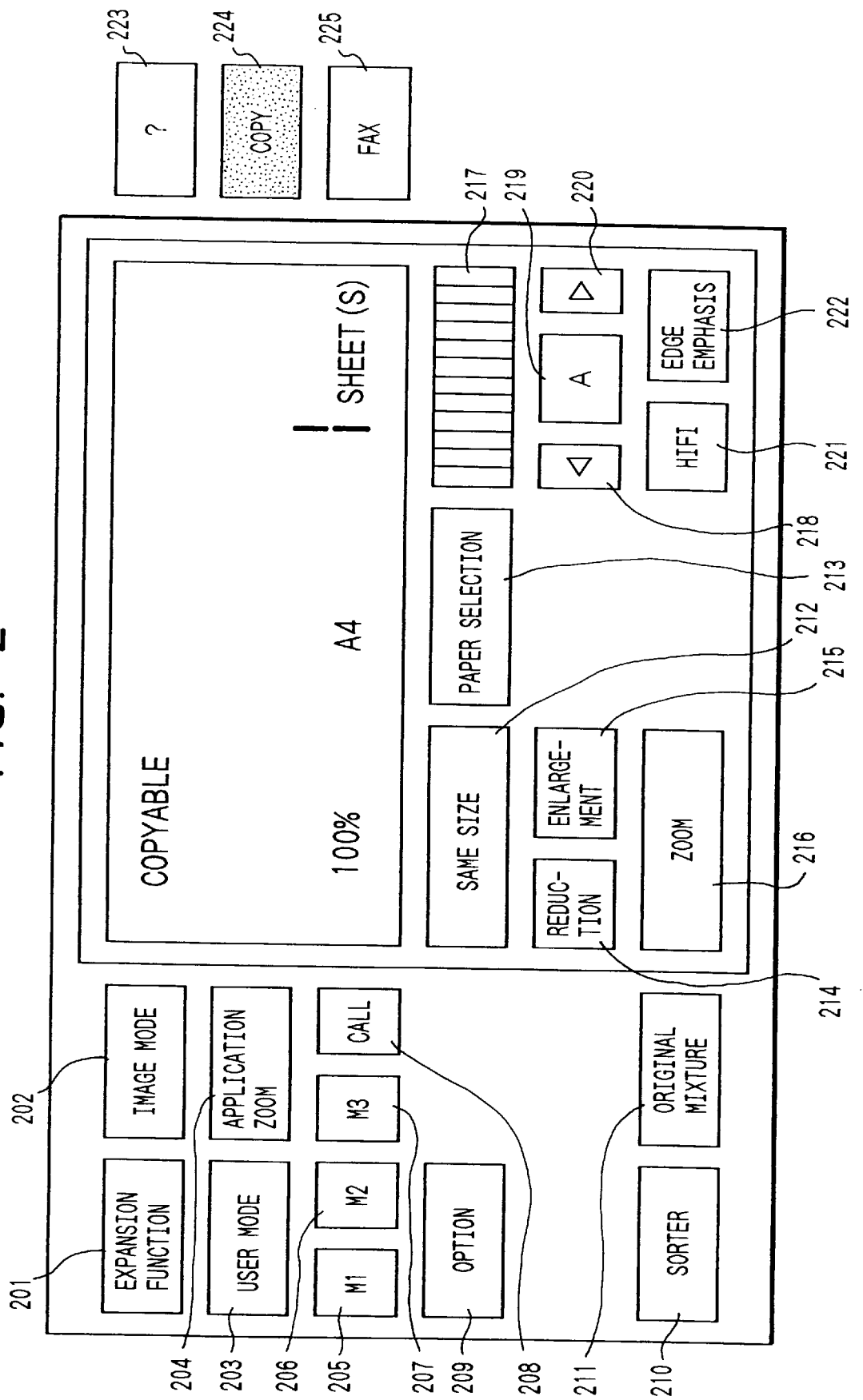
FIG. 2 is a diagram showing a fundamental image plane in a copy mode in an operation display unit 116 shown in FIG. 1.

FIG. 2 shows a fundamental image plane which is displayed by the operation display unit 116 shown in FIG. 1.

In FIG. 2, reference numeral 201 denotes an expansion function key. By depressing such a key, the apparatus is set to a mode of the two-side copy, multiple copy, movement, setting of a binding margin, setting of a trimming, or the like. Reference numeral 202 indicates an image mode key. By depressing the image mode key, the apparatus is set to a mode for performing a meshing, shading, trimming, or masking for a copy image. Reference numeral 203 denotes a user mode key by which a registration of a mode memory and a setting of a standard mode image plane can be executed every user. Reference numeral 204 indicates an application zoom key. By depressing the key 204, the apparatus is set to a mode to independently zoom the image in the directions of (X) and (Y) of the original or a mode of a zoom program to calculate a zoom magnification from the size of original and the copy size. Reference numerals 205, 206, and 207 indicate M1 key, M2 key, and M3 key which are depressed when mode memories are called out, respectively; 208 a call key which is depressed when the copy mode that was set at the preceding time is called out; 209 an option key for setting an optional function of a film projector to directly copy from a film or the like; 210 a sorter key for setting a mode to select a sorting operation, a grouping operation, or the like of the sorter; 211 an original mixture key which is depressed when originals of the sizes of (A4 and A3) or (B5 and B4) are set together to an original feeder; 212 a same size key which is depressed when the copy magnification is set to 100%; 214 and 215 a reduction key and an enlargement key which are depressed when executing the reduction or enlargement of a regular size; 216 a zoom key which is depressed when performing the reduction or enlargement of a non-regular size every 1%; 213 a paper selection key which is depressed when selecting a copy sheet; and 218 and 220 density keys. Each time the key 218 is depressed, the image is copied deeply. Whenever the key 220 is depressed, the image is copied thinly. Reference numeral 217 denotes a density display. The display changes to the right or left by depressing the density key; 219 an AE key which is depressed when the original such as a newspaper whose background color is deep is copied while automatically adjusting the density; 221 an HiFi key which is depressed when the original such as a photograph which has many halftone densities is copied; 222 an edge emphasis key which is depressed to emphasize characters when the original of characters is copied; and 223 a guide key. In the case where the user doesn't know the function of a key, by depressing the guide key, an explanation of such a key is displayed. Reference numeral 224 denotes a copy mode key which is depressed when the user executes the copy; and 225 a fax key which is depressed when the user executes the processes in the fax mode.

Figure 3:
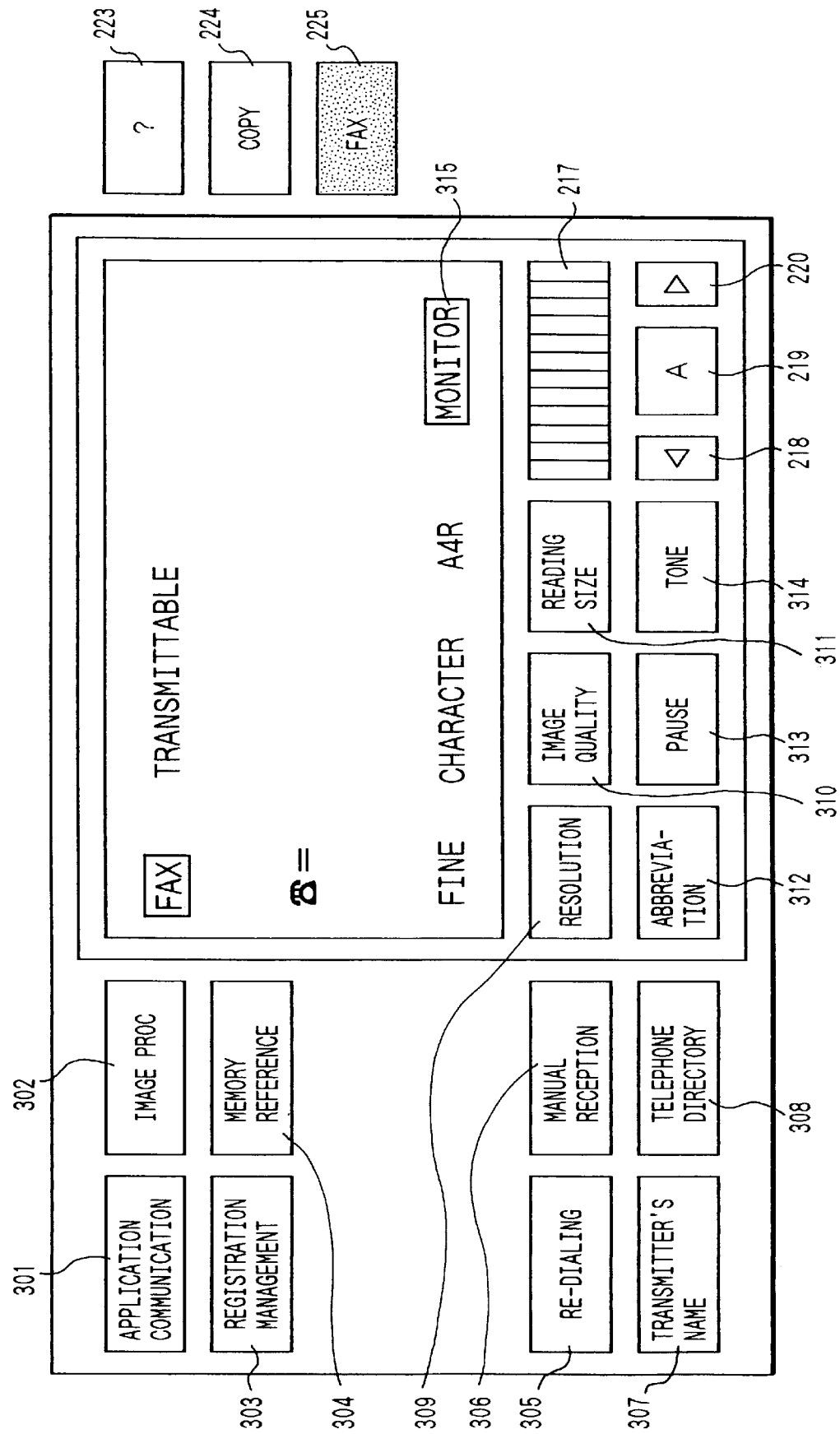
FIG. 3 is a diagram showing a fundamental image plane in a fax (facsimile) mode in the operation display unit 116 shown in FIG. 1.

FIG. 3 shows a fundamental image plane in the fax mode which is displayed in the operation display unit 116 shown in FIG. 1.

When the fax key 225 is depressed, such an image plane is displayed. Reference numeral 301 denotes an application communication key which is depressed when performing a timer communication, a confidential transmission, a polling, or the like; 302 an image processing key which is depressed when an area is designated by a marker or when the image processing such as masking, trimming, or the like is executed; 303 a registration management key which is depressed when a communication management report is displayed or an abbreviated dial number or a one-touch dial number is registered, or the like; 304 a memory reference key which is depressed when lists of transmission documents and reception documents in the memory are displayed or when images of such documents are displayed; 305 a re-dialing key which is depressed when continuously transmitting images to the same partner; 306 a manual reception key which is depressed when manually receiving; 307 a transmitter's name key which is depressed when the name of the transmitter is registered; 308 a telephone directory key which is depressed when the registered abbreviated dial number of the destination and the partner's abbreviated name are searched and transmitted; 309 a resolution key which is depressed when selecting a resolution mode of either one of standard, fine, super-fine, and ultra-fine; 310 an image quality key which is depressed when selecting an image quality mode of either one of characters and a halftone; 311 a reading size key which is depressed when manually designating a size of original; 312 an abbreviation key which is depressed when transmitting images to the destination whose abbreviation dial number has been registered; 313 a pause key which is depressed when holding a time interval between telephone numbers; 314 a tone key which is depressed when using a tone line; and 315 a monitor key which is depressed when confirming a transmission or reception state.

The operation of the embodiment having the above construction will now be explained with reference to flowcharts of FIGS. 4 to 16.

Figure 4:
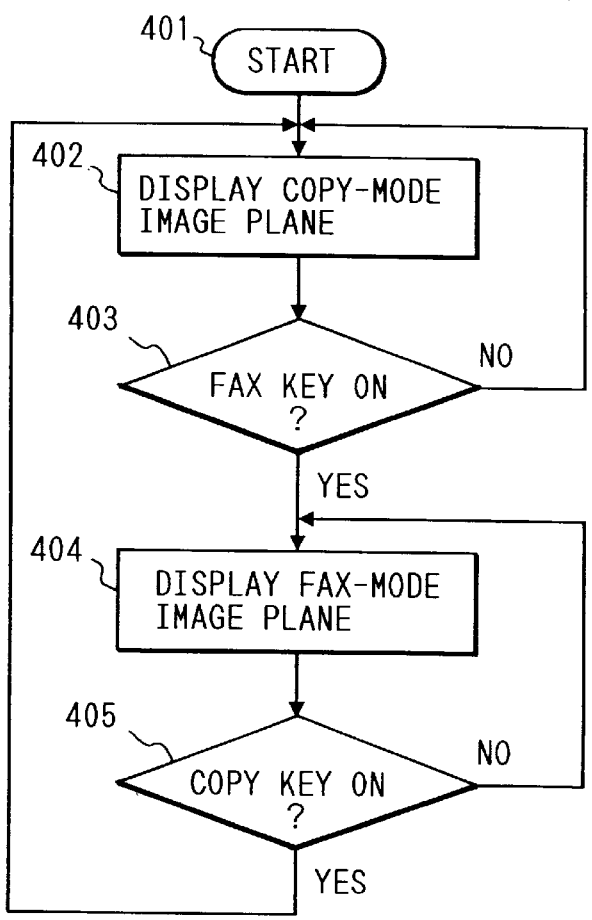
FIG. 4 is a diagram showing a flow of a mode switching in the operation display unit 116 shown in FIG. 1.

First, the operation image plane of the operation display unit 116 will now be described with reference to FIG. 4. First in step 402, an image plane of the copy mode shown in FIG. 2 is displayed. When the fax key 225 shown in FIG. 2 is depressed (403), a fax image plane is displayed (404). When the copy key (224 in FIG. 2) is depressed in the fax image plane (405), the display is returned to the copy image plane.

Figure 5:
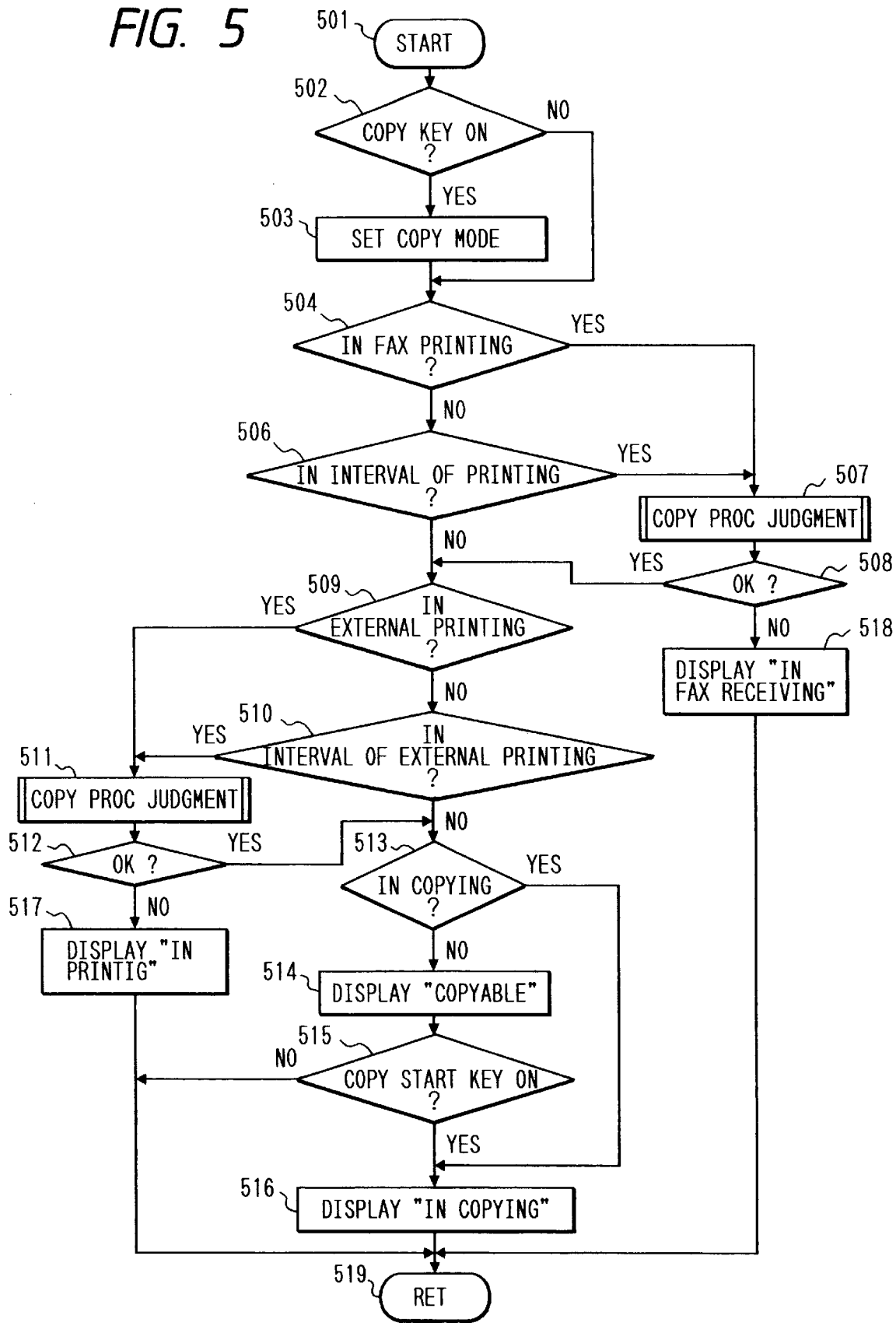
FIG. 5 is a diagram showing a flow of a process in case of selecting the copy mode.

FIG. 5 shows a flow of the processes when selecting the copy mode. First in step 502, when the copy mode key 224 is depressed, the copy mode image plane is displayed and a desired setting is executed. In step 504, it is judged whether or not the fax reception data is in printing. If NO, step 506 follows. If YES, step 507 follows. Subsequently in step 506, a check is made to see whether or not the apparatus is in the interval of printing of the facsimile, namely, whether or not the present state of the apparatus is a non-printing state between the printing operations of the received fax data. (Hereinbelow, a case during printing is referred to as "in printing" and a case where the printing is not executed in interval between pages is referred to as "in the interval of printing".) In step 507, it is judged whether or not both the copy mode which has been set at present, and a mode in printing of the facsimile reception data or a mode in the interval of printing of such data, can be executed. If they cannot be executed, a message of "in fax receiving" is displayed on the operation image plane of the operation display unit 116, thereby indicating that the copying operation cannot be executed. If they can be executed, a check is made to see whether or not the apparatus is in printing of the data from the external apparatus such as a computes or the like (step 509). It is judged whether or not the apparatus is in the interval of printing, namely, whether the apparatus is a non-printing state between the printings of a plurality of sheets (step 510). When the apparatus is in printing or in the interval of printing, it is judged whether both of the present set copy mode and the print mode from the external apparatus can be executed or not (steps 511 and 512). If NO, a message of "in printing" is displayed on the operation image plane of the operation display unit 116, thereby indicating that the copying operation cannot be performed.

Subsequently in step 513, a check is made to see if the apparatus is in copying or not. If YES, the processing routine is finished as it is. If NO, a message of "copyable" is displayed (step 514). When a copy start key (not shown) is depressed, further, a message of "in copying" is displayed on the operation image plane (steps 515 and 516).

Figure 6:
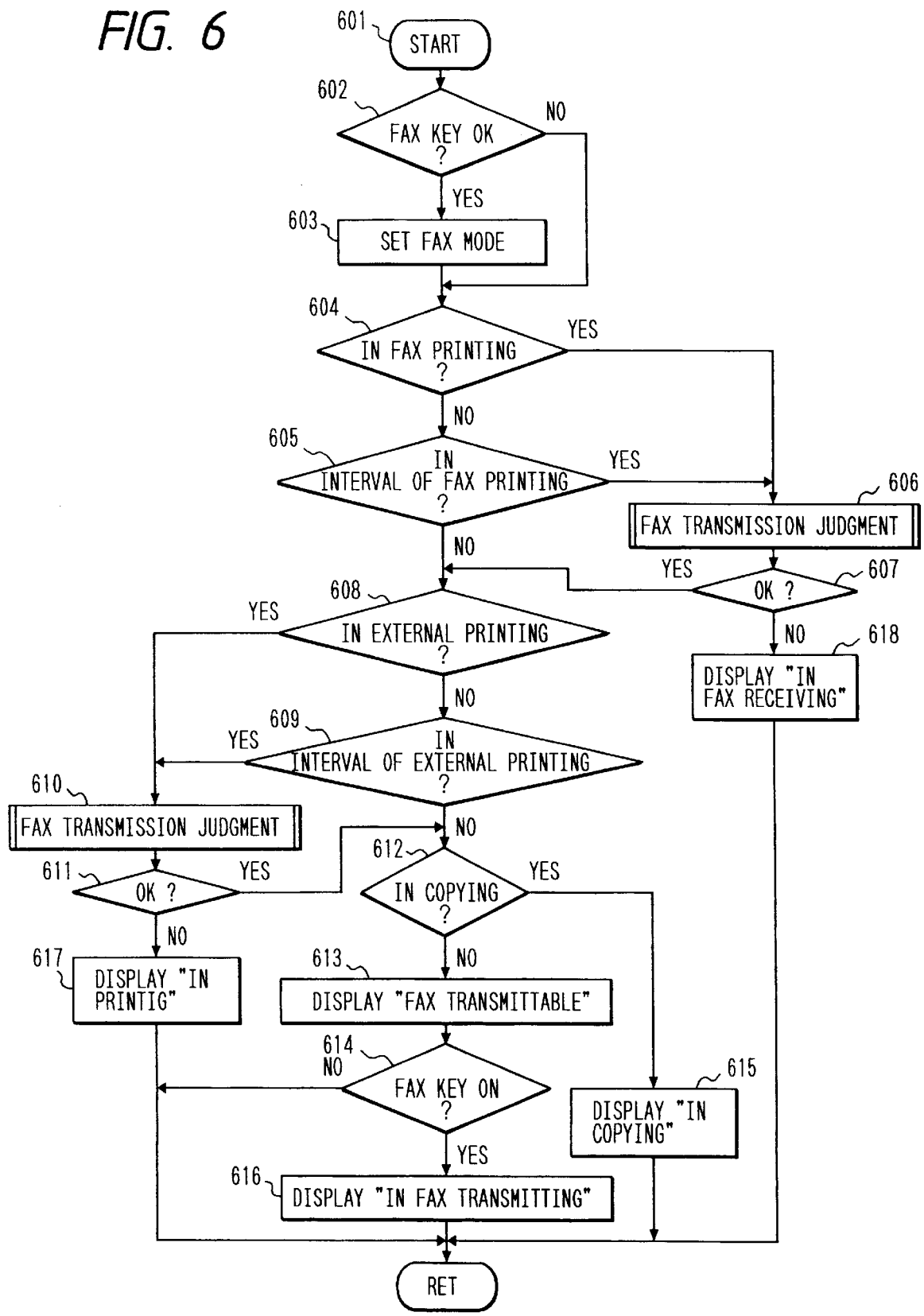
FIG. 6 is a diagram showing a flow of a process in case of selecting the fax mode.

FIG. 6 shows a flow of processes in case of selecting the fax mode.

First in step 602, it is judged whether the fax key 225 has been depressed or not. If YES, a fax mode image plane is displayed and the user performs a desired setting.

A check is subsequently made to see whether the apparatus is in printing of the facsimile reception data or is in the interval of printing or not. When the apparatus is in printing or in the interval of printing, the processing routine advances to a fax transmission judgment in step 606 and a check is made to see whether both of the mode in printing or in the interval of printing of the facsimile reception data and the set transmission mode can be simultaneously executed or not. If NO, a message of "in fax receiving" is displayed on the operation image plane of the operation display unit 116, thereby inhibiting the fax transmitting operation.

When the apparatus is in printing or in the interval of printing of the data from the external apparatus, the processing routine advances to the fax transmission processing judgment in step 610 and a judgment similar to that in step 606 is executed. When both of the modes cannot be simultaneously executed, a message of "in printing" is displayed on the operation image plane of the operation display unit 116, thereby inhibiting the transmitting operation.

In step 612, it is judged whether the apparatus is in copying or not. If YES, a message of "in copying" is displayed, thereby inhibiting the fax transmission. If NO, a message of "fax transmittable" is displayed on the operation image plane of the operation display unit 116. Further, when a fax transmission start key (not shown) is depressed, a message of "in fax transmitting" is displayed on the operation image plane of the operation display unit 116.

Figure 7:
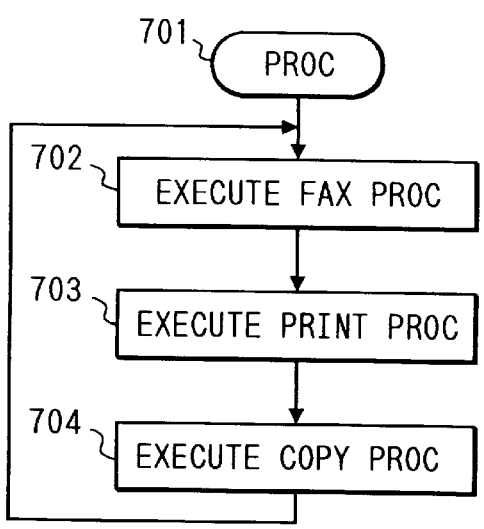
FIG. 7 is a diagram showing processes which are executed in the copying apparatus as an embodiment of the invention.

FIG. 7 shows processes that are executed in the copying apparatus of the embodiment.

The copying apparatus of the embodiment executes a fax processing, a print processing, and a copy processing.

FIGS. 8 to 10 show flowcharts for explaining in detail the processes in FIG. 7.

FIG. 8 is the flowchart showing a flow of the fax processing (step 702 in FIG. 7). First in step 802, it is judged whether the fax reception is performed (printable) at present or not. In case of the fax receivable state in step 803, step 804 follows. When a print request of the fax reception is generated, the reception processing is executed. When the fax reception cannot be performed in step 803 or when there is no reception request even in a receivable state, the processing routine advances to the fax transmission judgment in step 806.

As for the fax transmission judgment as well, in a manner similar to steps 803 to 805, it is judged whether the fax transmission can be performed or not in step 806. When the transmittable situation is judged and the transmission request is generated, the transmission processing is executed.

FIG. 9 is the flowchart showing a flow of the print processing in step 703 in FIG. 7.

First in step 902, a check is made to see if the data from the external apparatus can be printed or not. In the case where the print processing can be executed in step 903 and where there is a print request in step 904, the print processing is executed in step 905.

Similarly, FIG. 10 is the flowchart showing a flow of the copy processing in step 704 in FIG. 7.

First in step 1002, a check is made to see if the copy can be performed or not. When the copyable state is judged in step 1003 and there is a copy processing request in step 1004, the copy processing is executed in step 1005.

FIGS. 11 to 14 are flowcharts for explaining the contents of judging steps in the processes in FIGS. 8 to 10.

FIG. 11 is the flowchart for describing the fax reception judgment in step 802 in FIG. 8.

In a processing judgment in step 1102, a present situation of the apparatus is judged. For example, it is judged that ten sheets are being copied in a one-side copy mode.

Further, in step 1103, a mode to print the reception data when the data is facsimile received, for example, a mode upon printing such as one-side printing mode, two-side printing mode, high density mode, or low density mode is judged. In this instance, when the fax reception is not executed, no mode is designated.

In a compatibility judgment processing in step 1104, it is judged whether the situation of the apparatus judged in the processing judgment in step 1102 and the mode in which the apparatus facsimile receives data from now on and prints it are compatible or not. Namely, it is judged whether the print mode of the designated facsimile reception data can be executed in the present situation of the apparatus or not. After that, the processing routine is finished.

FIG. 12 shows the contents of the fax transmission judgment in step 806 in FIG. 8. Since the contents of the processing judgment portion in step 1202 are the same as those of the processing judgment portion in step 1102, their explanations are omitted here.

In the fax transmission destination mode judgment in step 1203, the transmission mode of the fax designated by the user from the operation display unit 116 is judged with respect to the fax transmission.

A compatibility judgment processing in step 1204 shows the same processing as that in step 1104. In this step, it is judged whether the situation of the apparatus and the transmission mode of the designated fax are compatible or not.

Figure 13:
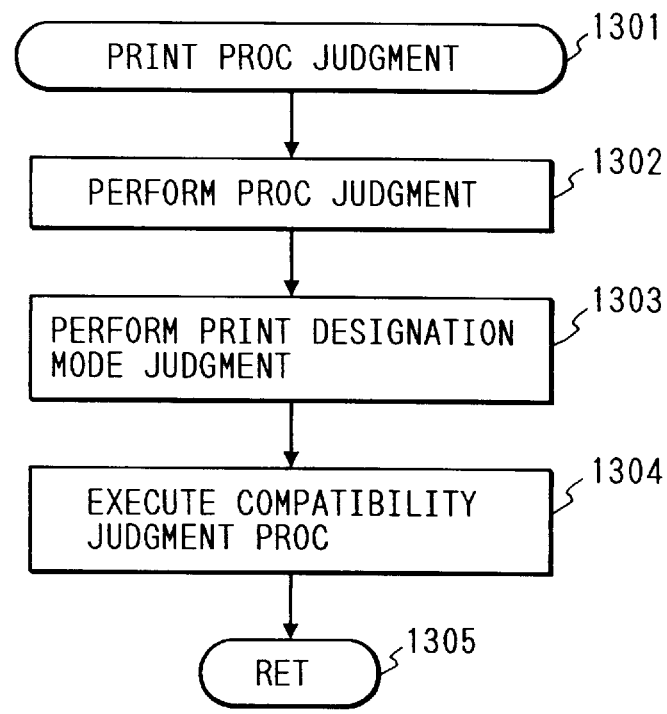
FIG. 13 is a diagram showing a print processing judgment in step 902 in FIG. 9.

FIG. 13 shows the print processing judgment in step 902 in FIG. 9.

In a print designation mode judgment in step 1303, a print designation mode designated by the external apparatus is judged. By the compatibility judgment processing in step 1304, it is judged whether the printing operation in the designated mode can be executed in the present situation of the apparatus or not.

Figure 14:
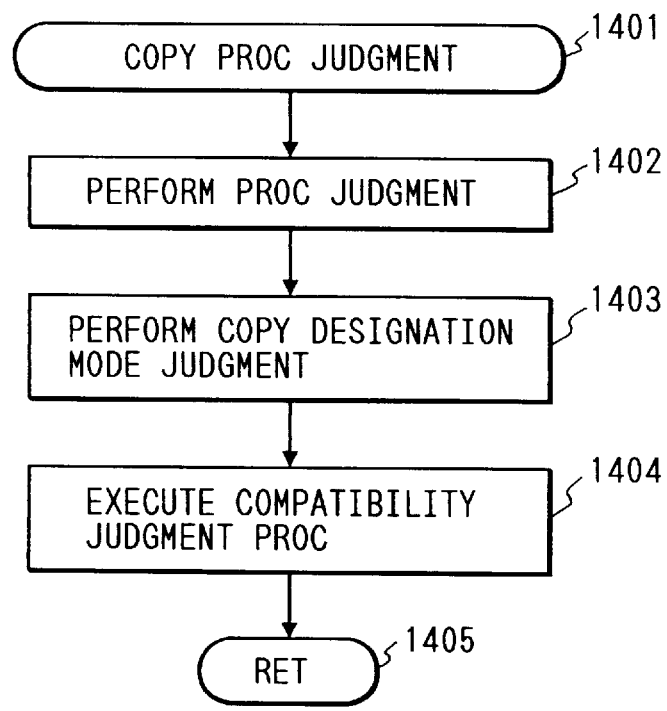
FIG. 14 is a diagram showing the details of a copy processing judgment in step 1002 in FIG. 10.

FIG. 14 shows the contents of the copy processing judgment in step 1002 in FIG. 10.

The situation of the apparatus is judged by the processing judgment in step 1402. By the copy designation mode judgment, setting conditions of the copy mode set by the image plane of the copy mode in FIG. 2 are judged. It is judged whether the copying operation can be executed in such conditions of the copy mode or not by the compatibility judgment processing.

Figure 15B:
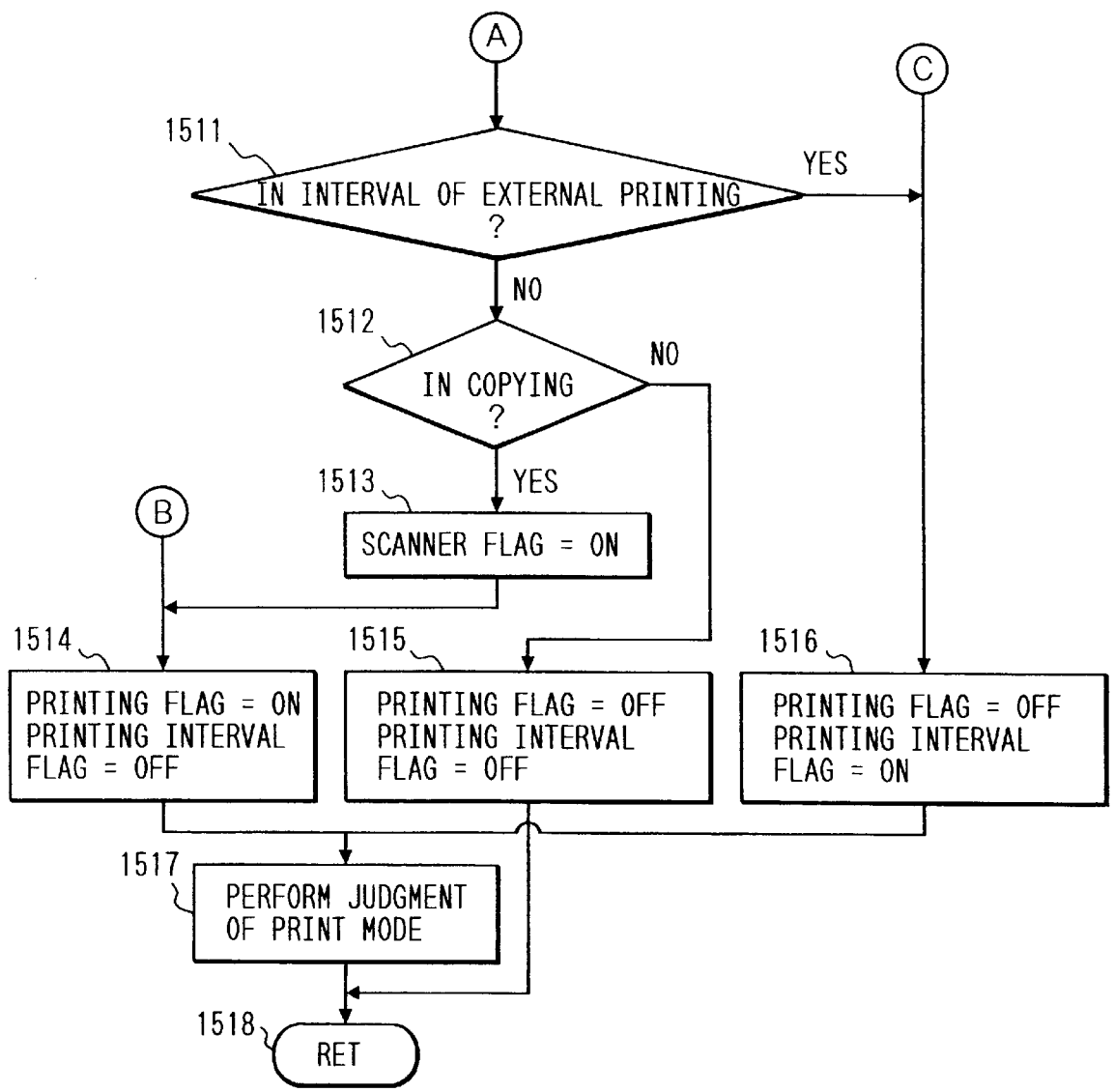
FIG. 15 which comprised of FIGS. 15A and 15B is a diagram showing the details of the processing judgment in FIGS. 11 to 14.

FIGS. 15A and 15B show flowcharts for explaining the contents of the processing judgments in FIGS. 11 to 14 in detail.

In steps 1502 and 1503, checks are made to see if the fax transmission data is in reading or in the interval of reading or not. When the data is in reading, the scanner flag is turned on. When the data is in the interval of reading, a scanner interval flag is turned on. When the data is not in reading, a scanner flag is turned off. When the data is not in the interval of reading, the scanner interval flag is turned off. "The data is in reading" denotes that the fax transmission data is at present being read. "The data is in the interval of reading" means that the data is not being read in the interval between the pages.

Subsequently, in the scanner mode judgment in step 1507, the read condition mode regarding the fax transmission is judged.

In step 1508, a check is made to see if the fax reception data is in printing or not. In step 1509, a check is made to see if the fax reception data of a plurality of pages is in the interval of printing or not. In step 1510, a check is made to see if the data from the external apparatus is in printing or not. In step 1511, a check is made to see if the data of a plurality of pages from the external apparatus is in the interval of printing or not. In step 1512, a check is made to see if the data is in copying or not.

A printing flag or a printing interval flag is turned on in accordance with each situation. When the data is in copying, the scanner flag is also turned on, so that the use of the scanner portion can be confirmed.

In the print mode judgment in step 1517, the designated condition mode with respect to the printing during the execution is discriminated.

FIG. 16 shows the contents of the compatibility judgement processing in FIGS. 11 to 14.

First in step 1602, a check is made to see if it is compatible or not. If YES, a compatibility flag is turned on. When it is judged to be incompatible, the compatibility flag is turned off.

Further, a method of judging the compatibility will now be specifically explained.

A method of inhibiting the two-side copy in the copying operation when the data from the external apparatus is in printing to both sides of the paper or in the interval of printing will now be described as an example.

It is now assumed that a mode to print the data of ten pages from the external apparatus is printed to both sides of fine papers has been set.

FIG. 10 is a copy processing flowchart for specifically explaining the contents of the copy processing in step 704 in FIG. 7. FIG. 14 is a flowchart for explaining further in detail the copy processing judgment in step 1002 in the copy processing flow.

In the processing judgment in step 1402 in FIG. 14, it is now assumed that the paper of the first page is fed from the cassette 14 in FIG. 22 in order to print the data from the external apparatus to both sides of the paper. When the paper feeding operation is started, the sensor ps2 is turned on. When the printing is further started, it is judged in step 1510 in FIG. 15A that the data is in printing. In step 1514, the printing flag is turned on.

In the print mode judgment in step 1517 in FIG. 15B, it is judged that the two-side printing of the data from the external apparatus is being executed.

When the expansion key 201 is depressed on the operation picture plane of the copy mode shown in FIG. 2, the two-side copy mode is set by the depression of a two-side copy key (not shown) as one of the keys which are displayed by being switched from the present display. Thus, it is judged that the two-side copy mode has been designated by the copy designation mode judgment in step 1403 in FIG. 14. Subsequently, in step 1602 in FIG. 16 showing the details of the compatibility judgment processing in step 1404, since the data from the external apparatus is at present in printing, the copying operation is impossible. Therefore, it is judged to be incompatible. A compatibility flag is turned off in step 1604.

Returning to FIG. 10, it is judged that the copying is impossible in step 1003. The message in step 517 in FIG. 5 is displayed by the operation display unit 116.

After completion of the printing of the first page, when it is being prepared to print the subsequent second page, the paper is enclosed in the intermediate tray (24 in FIG. 22). In this instance, it is judged in step 1511 in FIG. 15B that the data is in the interval of printing. The printing interval flag is turned on in step 1516. Subsequently, it is judged by the print mode judgment (step 1517) that the two-side printing of the data from the external apparatus is being executed.

In the copy designation mode judgment in step 1403 in FIG. 14, the two-side copy mode is subsequently designated. In the compatibility judgment processing in step 1404, even when the data from the external apparatus is in the interval of printing by the two-side printing method, so long as the copy designation mode is the two-side copy mode, there is a possibility such that the paper and the paper in the intermediate tray mixedly exist. Therefore, to inhibit the two-side copy, the compatibility flag is turned off in step 1604 in FIG. 16. When both of the printing flag and the printing interval flag are off, this means that the printing has been finished. Therefore, the corresponding message is displayed to permit the two-side copy.

FIG. 17 is a flowchart showing the flow of the above series of processings.

In the embodiment, when the printing flag is on, the interruption regarding the printing is inhibited. When the printing flag is off and in the case where it is judged that the two-side printing of the data from the external apparatus is being executed in the print mode judgment in step 1517 in FIG. 15B and where the two-side copy is designated in the copy designation mode judgment in step 1403 in FIG. 14, the two-side copy is inhibited. The latter case is not limited to the case of inhibiting the interruption of the two-side copy during the execution of the two-side printing of the data from the external apparatus but is also applied to all of the cases regarding the two-side printing. In the case where the two-side printing is being executed, however, the interruption of the one-side copy is permitted in the interval of printing. The interruption in the same mode is executed after depression of the interruption key. The interruption between the different modes is executed after the mode switching key (224, 225) was depressed.

According to the embodiment as described above, the inhibition or permission of the interruption is decided, namely, whether the compatibility flag is turned off or on is determined on the basis the states of the scanner flag, scanner interval flag, printing flag, and printing interval flag, the result of the print mode judgment in step 1517 in FIG. 15B, and the result of each of the designation mode judgments in step 1103 in FIG. 11, step 1203 in FIG. 12, step 1303 in FIG. 13, and step 1403 in FIG. 14. Therefore, a plurality of processes can be efficiently executed.

Since whether the interruption can be performed at present or not is judged and the judgment result is displayed (514, 517, and 518 in FIG. 5; 613, 615, and 617 in FIG. 6), the operator can easily recognize. The operator can also recognize which function can be executed at present, so that the operating efficiency is improved.

Second Embodiment

In the first embodiment, the two-side copy operation has been inhibited until the two-side printing is perfectly finished. However, in the second embodiment, explanation will now be made with respect to the case where the two-side copy is permitted when no paper is left in the intermediate tray.

A method of inhibiting or permitting the two-side copy in the copying operation when the data of two pages from the external apparatus are in printing to both sides of five papers or in the interval of printing will now be described as an example.

In the processing judgment in step 1402 in FIG. 14, it is now assumed that one paper is fed from the cassette 14 in FIG. 22 in order to print the data from the external apparatus to both sides of the paper. When the paper feeding operation is started, the sensor ps2 is turned on. Further, when the printing is started, it is judged that the data is in printing in step 1510 in FIG. 15A. The printing flag is turned on in step 1514.

In the print mode judgment in step 1517 in FIG. 15B, it is judged that the two-side printing of the data from the external apparatus is being executed.

When the two-side copy mode is subsequently set, the compatibility flag is turned off in order to inhibit the execution of the two-side copy in a manner similar to the first embodiment.

After completion of the printing (one side of the paper) of the data of the first page from the external apparatus, in a state in which it is prepared to print the subsequent page (back side of the same paper), the paper is enclosed in the intermediate tray (24 in FIG. 22).

In this instance, in step 1511 in FIG. 15B, it is judged that the data is in printing. It is also judged that the two-side printing of the data from the external apparatus is being executed and that the paper exists in the intermediate tray due to the print mode judgment (step 1517).

Subsequently, the two-side copy mode is designated in the copy designation mode judgment in step 1403 in FIG. 14. Therefore, in the compatibility judgment processing in step 1404, it is judged that the intermediate tray is being used in the print mode and the two-side copy is impossible. It is judged that it is not compatible with the copying operation.

"NO" is selected in the judgment regarding "copyable?" in step 1003 in FIG. 10. The copy processing is inhibited.

Subsequently, the paper enclosed in the intermediate tray is fed and the printing of the second page is performed. When the paper passes through the paper ejection sensor (19 in FIG. 22) and is ejected out to the paper ejection tray 20, the following operations are executed until the start of the printing operation of the third page.

In this instance, although it is judged that the data is in the interval of printing in step 1511 in FIG. 15B, it is confirmed by the paper detection sensor ps5 in FIG. 22 that no paper is left in the intermediate tray. Thus, it is judged that the two-side copy mode has been designated in "copy designation mode judgment" in step 1403 in FIG. 14. However, it is judged to be compatible in "compatibility judgment processing" in step 1404. This is because even when the apparatus is shifted to the two-side copying operation mode at this time point, since no paper is left in the intermediate tray, the two-side copying operation is executed and, after completion of the two-side copying operation, the printing operation is subsequently executed.

Returning to FIG. 10, "copyable" is selected in the judgment processing of "copyable?" in step 1003. A check is made to see if there is a "copy processing request" or not in step 1004. When the copy processing request is inputted, the "copy processing" operation in step 1005 is executed. In this instance, it is judged to be two-side copy in the "processing judgment" in step 1302 in FIG. 13. Therefore, it is judged that it is not compatible with the print processing in the "compatibility judgment processing" in step 1304. The print processing is inhibited. In this manner, the print processing from the external apparatus is interrupted until the end of the copying operation. After completion of the copying operation, "fax processing" in step 702 in FIG. 7 is executed and the print processing is subsequently performed. FIG. 18 is a flowchart showing the flow of the above series of processings. The "fax processing" at this time will now be described hereinbelow.

When the copy processing request is not generated in "copy processing request" in step 1004, the processing routine is finished in RET in step 1006 and advances to the "fax processing" in step 702 in FIG. 7. In the fax reception judgment in FIG. 11, it is judged to be in the interval of printing in the "processing judgment" in step 1102. It is judged that it is not compatible with the fax reception when the data from the external apparatus is being outputted in the "compatibility judgment processing" in step 1104. The fax reception processing is finished (the reception data is not printed). In the set picture plane of the copy mode, since the fax transmission is not performed, the fax transmission processing is finished.

Subsequently, the print processing of the third page is subsequently executed by the "print processing" in step 703 in FIG. 7 in a manner similar to the print processing of the first page. The above processings are repeated until the data of ten pages is outputted in this manner.

As mentioned above, according to the second embodiment, a check is made to see if the paper is left in the intermediate tray or not. Even if the data from the external apparatus is in processing, when no paper is left in the intermediate tray in the interval of two-side printing, namely, when no paper is left in the copying apparatus, the interrupting operation of the two-side copy is permitted. Therefore, it is possible to prevent that the user who intends to perform the two-side copy by the interruption waits for a long time. The apparatus can be made further efficiently operate without executing the operation of the apparatus in vain.

Third Embodiment

Figure 21:
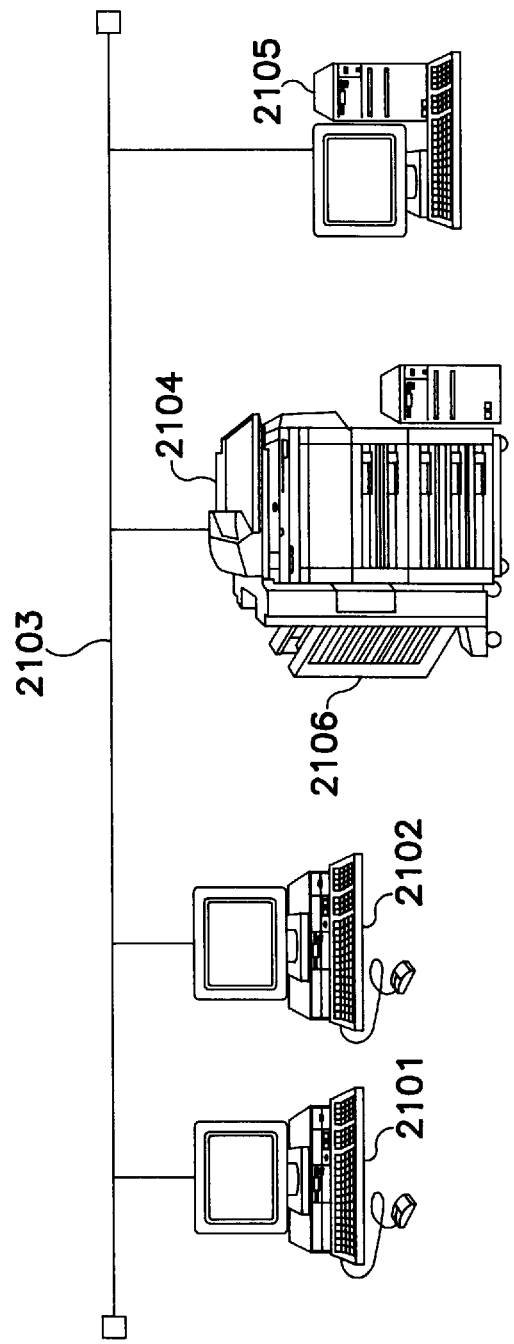
FIG. 21 is a diagram showing a connection example in the case where the copying apparatus shown in FIG. 1 is connected to an LAN.

The above embodiment has been described with respect to the case of interrupting the copy processing when the image data that is sent from the external apparatus is in printing. However, in the following third embodiment, an explanation will now be made with respect to the case where there is a print request from the external apparatus when the data is in copying or the fax reception data is in printing or the image data that is sent from another external apparatus is in printing. FIG. 21 shows an example of a system configuration in the case where the copying apparatuses shown in FIGS. 1 and 22 are connected to a network. In FIG. 21, reference numerals 2101, 2102, and 2105 denote external apparatuses such as personal computers or the like; 2103 a local area network (LAN) to connect various equipment; and 2104 a copying apparatus shown in FIGS. 1 and 22. Various image data such as document data, figure data, and the like formed by the external apparatus 2101, 2102, or 2105 is sent to the copying apparatus 2104 together with a print command and is subjected to a print processing by the laser 107 of the copying apparatus 2104. Reference numeral 2106 denotes a sorter having a plurality of bins.

Figure 19:
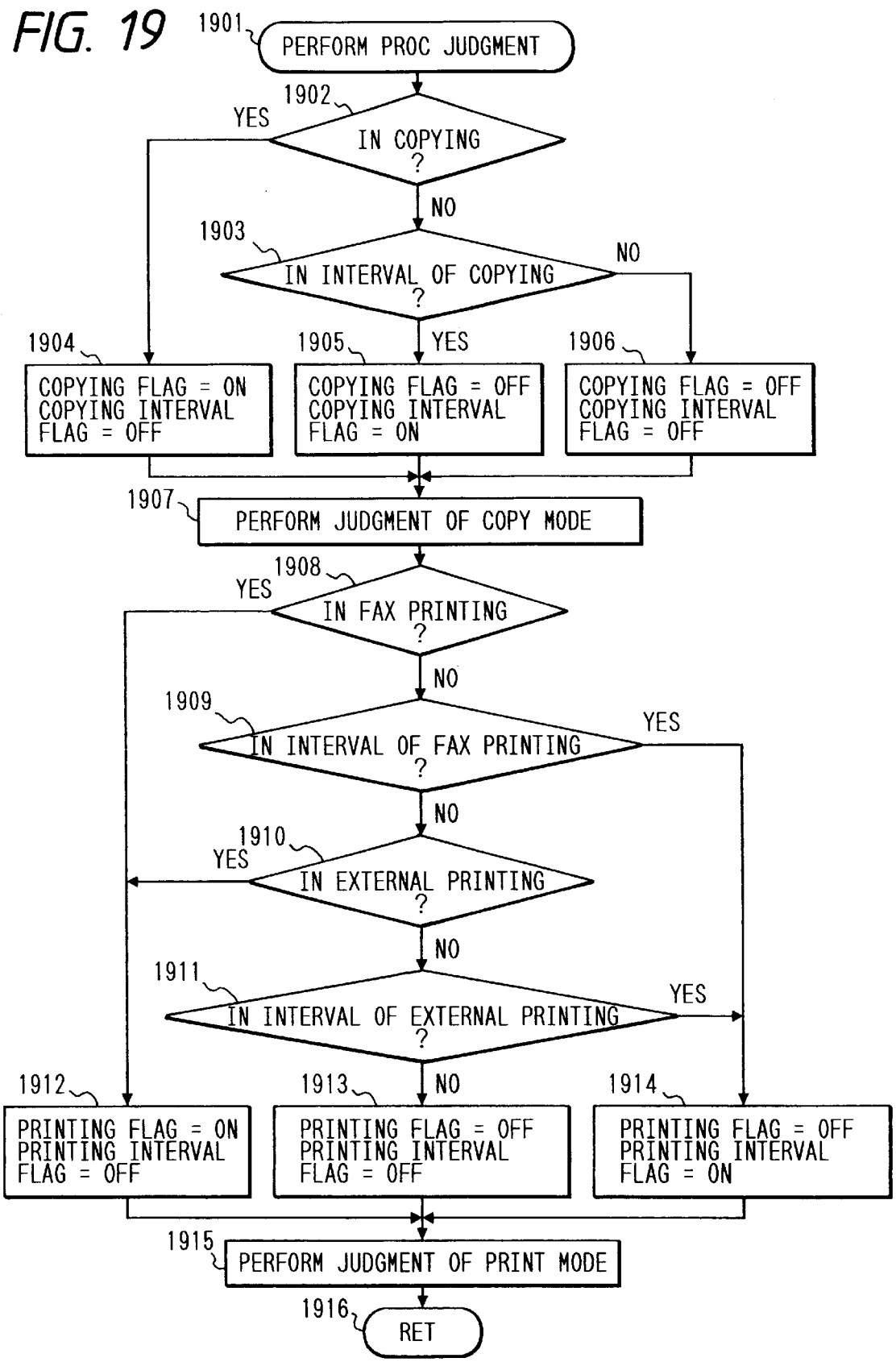
FIG. 19 is a diagram showing the details of a judgment of a situation of the process in executing.

FIG. 19 is a flowchart showing a flow for judging an operation situation regarding the print processing of the copying apparatus 2104. As shown in FIG. 19, checks are made to see if the data is in copying, the data is in the interval of copying, the data is in printing, and the data is in the interval of printing, the on/off states of the corresponding flags are set.

Figure 20B:
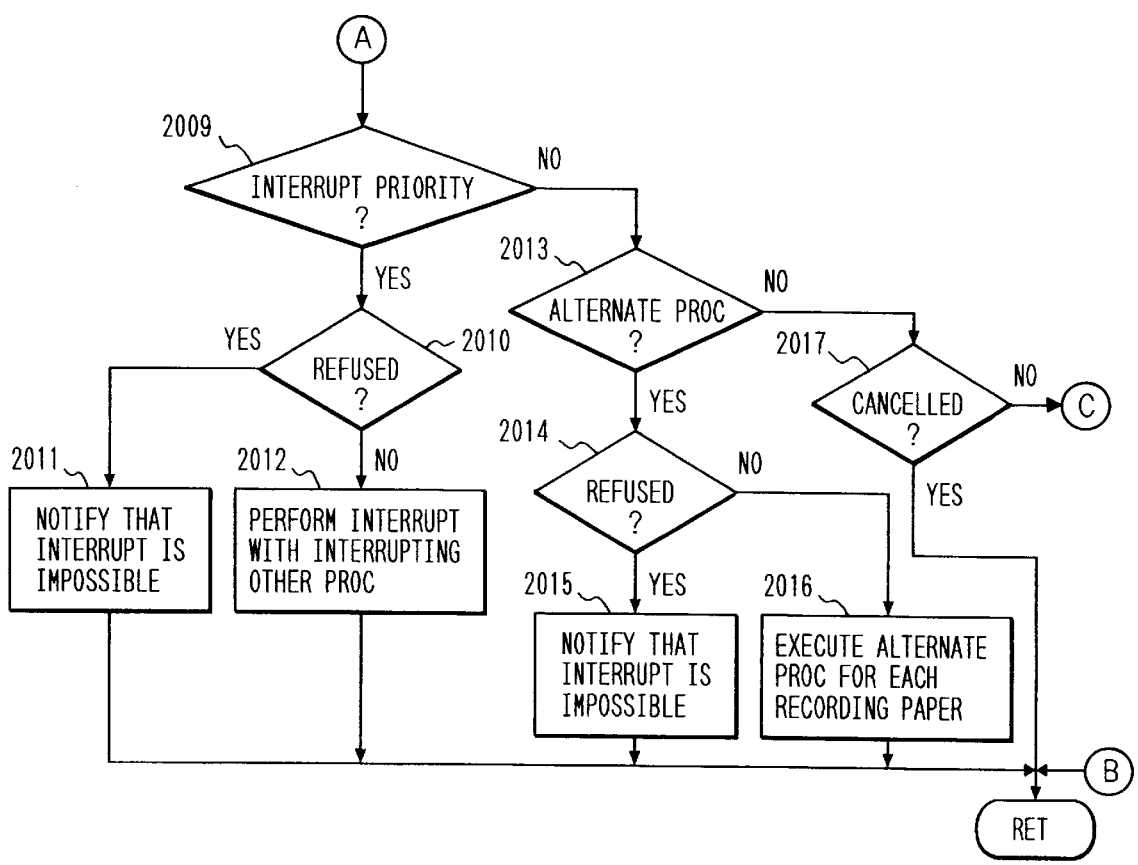
FIG. 20 which comprised of FIGS. 20A and 20B is a diagram showing a flow of a processing in the case where there is a print request from an external apparatus.

A flow of the processings of the copying apparatus 2104 based on the third embodiment will now be described with reference to flowcharts shown in FIGS. 20A and 20B.

First in step 2002, a check is made to see if there is a print request from the external apparatus or not. When there is the print request, step 2003 follows and a check is made to see if the copying is being performed or not by discriminating the states of the copying flag and the copying interval flag. When the copying is being performed, step 2004 follows and such a fact is notified to the external apparatus which generated the print request.

When it is judged that the copying is not performed in step 2003, step 2005 follows and a check is made to see if the printing is being executed or not. The printing here denotes the printing of the fax reception data or the printing of the image data sent from an external apparatus other than the external apparatus which generated the print request. When it is judged that the printing is being executed, step 2007 follows and such a fact is notified to the external apparatus which generated the print request. On the other hand, when it is judged in step 2005 that the printing is not executed, step 2006 follows and the image data is received from the external apparatus which received the print request in step 2002 and is subjected to the print processing in the mode designated from the external apparatus.

In step 2008, a request to select a processing is sent to the external apparatus which generated the print request. The processing to be selected here is a mode to preferentially perform the interruption, a mode to alternately process, or a cancellation. In the mode to preferentially execute the interruption, the copying or printing that is at present being executed is interrupted when the operation enters the interval of copying or the interval of printing. The image data that is sent from the external apparatus which generated the print request is printed. (When the image data of a plurality of pages is sent, all of them are printed.) After that, the interrupted copying or printing is restarted. However, when the processing which has already been executed is the two-side copy or two-side printing and when the print request from the external apparatus is the two-side printing, the processing is interrupted in the case where no paper is left in the intermediate tray in a manner similar to the foregoing second embodiment. In the mode to alternately process, both of the copying or printing that is at present being executed and the printing requested are alternately performed for every recording of one paper. Namely, in the two-side printing, the data is printed to the back and front sides of the paper. In the one-side printing, the data is printed to one side of the paper and the processing is switched each time the paper is ejected out. In the copying apparatus 2104 of the embodiment, a refusal of the interruption can be set by the console unit 123. When the refusal of the interruption is set, even if the above two kinds of modes are selected, the processing which has already been executed is not interrupted.

When the mode to preferentially interrupt is selected from the external apparatus in step 2009, step 2010 follows and a check is made to see if the refusal of the interruption has been set or not. If YES, a fact that the print processing by the interruption cannot be executed is notified to the external apparatus which generated the print request. If NO, the copying or printing which has already been executed is interrupted, the image data that is sent from the external apparatus which generated the print request is received, and the print processing is executed in accordance with the mode designated from the external apparatus. After completion of the print processing, the interrupted copying or printing is restarted. In this instance, the printed recording paper is ejected to a different bin every processing by a sorter 2106.

When the mode to alternately process is selected in step 2013, step 2014 follows and a check is made to see if the refusal of the interruption has been set or not. If YES, a fact that the print processing by the interruption cannot be performed is notified to the external apparatus which generated the print request. If NO, the recording of one recording paper is finished by the copying or printing which has already been executed. When the paper is ejected out, the processing is once interrupted. The image data sent from the external apparatus which generated the print request is recorded. After that, the processing which has already been executed and the printing of the image data sent from the external apparatus are alternately performed every recording paper. However, when either one of the processings is finished, the copying or printing is continuously executed. In this instance, the printed recording paper is ejected to a different bin every processing by the sorter 2106.

When the external apparatus which generated the print request selects the cancellation in step 2107, the print request is cancelled and the copying or printing that has already been executed is continued.

As described above, according to the third embodiment, the processing situation of the copying apparatus 2104 can be notified to the operator of the external apparatus located at a remote position from the copying apparatus 2104.

In case of generating the print request from the external apparatus, even when the copying apparatus 2104 is executing the processing regarding the recording, two kinds of interruption modes (the mode to preferentially perform the interruption and the mode to alternately process) can be selected.

It is also possible to select the cancellation in step 2017 and to print by another printer connected to the LAN 2103.

On the side of the copying apparatus 2104, since the refusal of the interruption can be set, it is also possible not to interrupt.

In the above third embodiment, when the two-side copy or two-side printing is being executed, if there is a print request of the two-side printing from the external apparatus, the interruption is executed so long as no paper is left in the intermediate tray. However, it is also possible not to accept the two-side print request from the external apparatus in a manner similar to the foregoing first embodiment. In this instance, when the paper exists in the intermediate tray, the print request of the one-side printing from the external apparatus is permitted.

It is also possible to construct in a manner such that the number of print papers is discriminated by the print request from the external apparatus and when the number of pages is small, the interruption printing is permitted and, when the number of pages is large, the interruption printing is inhibited.

It is also possible to construct in a manner such that when the print request is generated from the external apparatus, if it is confirmed that the copying apparatus 2104 is executing the copying or printing (step 2004 or 2007), by depressing the interruption key of the console unit 123 of the copying apparatus 2104 by the operator of the external apparatus, the copying or printing in execution is interrupted and the print processing from the external apparatus is preferentially interrupted.

As described above, according to the invention, even when a plurality of processings compete, the processings can be efficiently executed.

Although the present invention has been described with respect to the preferred embodiments, the invention is not limited to the foregoing embodiments but many modifications and variations are possible within the spirit and scope of the appended claims of the invention.

What is claimed is:

1. An image processing apparatus comprising:
   first processing means for outputting first image data;
   second processing means for outputting second image data different from the first image data;
   first detecting means for detecting a processing stage of said first processing means;
   second detecting means for detecting a processing condition of said second processing means; and
   judging means for judging whether operations to interrupt the processing by said first processing means and to execute the processing by said second processing means shall be permitted or inhibited on the basis of a first detection result of said first detecting means and a second detection result of said second detecting means.

2. An apparatus according to claim 1, further having display means for displaying a judgment result by said judging means.

3. An apparatus according to claim 1, wherein said judging means inhibits the execution of the processing by said second processing means when said first detecting means detects that said first processing means is executing a processing to print the input image data to both sides of a sheet and when said second detecting means detects that a processing to print the input image data to both sides of the sheet and when said second detecting means detects that a processing to print the input image data to both sides of the sheet by the second processing means has been set.

4. An apparatus according to claim 1, wherein said judging means permits the execution of the processing by said second processing means when said first detecting means detects that said first processing means is executing a processing to print the input image data to both sides of a sheet and that no sheet is left in said apparatus.

5. An image processing apparatus comprising:
   input means for inputting image data;
   recording means for recording the image data inputted by said input means to a sheet;
   storing means for temporarily storing the sheet on which the image data was recorded to one side of the sheet by said recording means; and
   judging means for judging whether operations, which interrupt a current job for recording the image data by said recording means and execute another job, shall be permitted or inhibited,
   wherein said judging means permits the interruption in the case where no sheet is stored in said storing means and where the recording by said recording means is not performed.

6. An apparatus according to claim 5, wherein said storing means reverses the sheet on which the image data was recorded to one side by said recording means and, after that, stores the reversed sheet.

7. An apparatus according to claim 5 or 6, wherein said another job to be interrupted is a job for recording the image data inputted by said input means to both sides of the sheet by said recording means.

8. An image processing apparatus comprising:
   first processing means for outputting input image data;
   second processing means for outputting another image data different from the image data in said first processing means; and
   confirming means for confirming whether the processing by said second processing means is executed in the case where there is a request for the processing by said second processing means during the execution of the processing by said first processing means or not,
   wherein said confirming means includes requirement means for requiring an instruction of execution methods of processing by said first and second processing means.

9. An apparatus according to claim 8, wherein said second processing means executes a processing based on an output request from an external apparatus.

10. An apparatus according to claim 8, wherein for the confirmation by said confirming means, when there is an instruction to interrupt the processing by said first processing means and to execute the processing by said second processing means, the processing by said first processing means is temporarily interrupted, the processing by said second processing means is executed, and after completion of the processing by said second processing means, the interrupted processing by said first processing means is restarted.

11. An apparatus according to claim 8, wherein for the confirmation by said confirming means, when there is an instruction to alternately execute the processing by said first processing means and the processing by said second processing means, the processing by said first processing means and the processing by said second processing means are switched each time a predetermined processing is executed, respectively.

12. An image processing apparatus comprising:
   first processing means for outputting first image data;
   second processing means for outputting second image data different from the first image data;
   detecting means for detecting a processing condition of said first processing means; and
   control means for changing, in accordance with a detection result of said detecting means, a processing condition of said second processing means by interrupting the processing by said first processing means.

13. An apparatus according to claim 12, wherein said first processing means outputs the image data input from an external apparatus.

14. An apparatus according to claim 12, wherein, in a case where said detecting means detects that the processing by said first processing means is to print images on both surfaces of a sheet, said control means inhibits the processing of said second processing means to print images on the both surfaces of the sheet and allows the processing of the second processing means to print the images on a one-side surface of the sheet.

15. An apparatus according to claim 12, wherein, in a case where said detecting means detects that the processing by said first processing means is to print images on a one-side surface of a sheet, said control means allows the processing of said second processing means to print images on the both surfaces of the sheet and the processing of said second processing means to print the images on the one-side surface of the sheet.

16. An image processing apparatus comprising:
   first processing means for outputting image data input from an external apparatus;
   second processing means for outputting another image data different from the image data in said first processing means; and
   confirming means for confirming, to the external apparatus, whether the processing by said first processing means is executed in a case where there is a request for the processing by said first processing means during the execution of the processing by said second processing means or not.

17. An apparatus according to claim 16, wherein for the confirmation by said confirming means, when there is an instruction to interrupt the processing by said second processing means and to execute the processing by said first processing means, the processing by said second processing means is temporarily interrupted, the processing by said first processing means is executed, and after completion of the processing by said first processing means, the interrupted processing by said second processing means is restarted.

18. An apparatus according to claim 16, wherein for the confirmation by said confirming means, when there is an instruction to alternately execute the processing by said second processing means and the processing by said first processing means, the processing by said second processing means and the processing by said first processing means are switched each time a predetermined processing is executed.

19. An image processing method in an image processing apparatus having a first processing means for outputting first image data and a second processing means for outputting second image data different from the first image data, said method comprising the steps of:
   detecting a processing stage of said first processing means;
   detecting a processing condition of said second processing means; and
   judging whether operations to interrupt the processing by said first processing means and to execute the processing by said second processing means shall be permitted or inhibited on the basis of results of the detection of the processing stage of the first processing means and the detection of the processing condition of the second processing means.

20. A method according to claim 19, further comprising the step of displaying a result of the judging.

21. An method according to claim 19, wherein said judging step inhibits the execution of the processing by said second processing means when the situation detecting step detects that said first processing means is executing a processing to print the input image data to both sides of a sheet and when said content detecting step detects a processing to print the input image data to both sides of the sheet and when said content detecting step detects that a processing to print the input image data to both sides of the sheet by the second processing means has been set.

22. A method according to claim 19, wherein the judging step permits the execution of the processing by said second processing means when said situation detecting step detects that said first processing means is executing a processing to print the input image data to both sides of a sheet and that no sheet is left.

23. An image processing method comprising the steps of:
   inputting image data;
   recording the image data inputted said input step to a sheet;
   temporarily storing a sheet on which the image data was recorded to one side in said recording step; and
   judging whether operations, which interrupt a current job for recording and execute another job, are permitted or inhibited,
   wherein said judging step permits the interruption in the case where no sheet is stored and where the recording is not performed.

24. A method according to claim 23, wherein said storing step reverses the sheet on which the image data was recorded to one side and, after that, stores the reversed sheet.

25. A method according to claim 23 or 24, wherein said another job to be interrupted is a job for recording the image data inputted to both sides of the sheet in the recording step.

26. An image processing method in an image processing apparatus having first processing means for outputting input image data and second processing means for outputting another image data different from the image data in the first processing means comprising the step of confirming whether the processing by said second processing means is executed in the case where there is a request for the processing by said second processing means during the execution of the processing by said first processing means or not, wherein said confirming step includes requiring an instruction of execution methods of processing by said first and second processing means.

27. A method according to claim 26, wherein said second processing means executes a processing based on an output request from an external apparatus.

28. A method according to claim 26, wherein for the confirmation by said confirming means, when there is an instruction to interrupt the processing by said first processing means and to execute the processing by said second processing means, the processing by said first processing means is temporarily interrupted, the processing by said second processing means is executed, and after completion of the processing by said second processing means, the interrupted processing by said first processing means is restarted.

29. A method according to claim 26, wherein for the confirmation by said confirming means, when there is an instruction to alternately execute the processing by said first processing means and the processing by said second processing means, the processing by said first processing means and the processing by said second processing means are switched each time a predetermined processing is executed, respectively.

30. An image processing method in an image processing apparatus having first processing means for outputting first image data and second processing means for outputting second image data different from the first image data, said method comprising the steps of:

detecting a processing condition of said first processing means; and changing, in accordance with a detection result in said detecting step, a processing condition of said second processing means by interrupting the processing by said first processing means.

31. A method according to claim 30, wherein said first processing means outputs the image data input from an external apparatus.

32. A method according to claim 30, wherein, in a case where the detecting step detects that the processing by said first processing means is to print images on both surfaces of a sheet, the control step inhibits the processing of said second processing means to print images on the both surfaces of the sheet and allows the processing of the second processing means to print the images on a one-side surface of the sheet.

33. A method according to claim 30, wherein, in a case where the detecting step detects that the processing by said first processing means is to print images on a one-side surface of a sheet, the control step allows the processing of said second processing means to print images on the both surfaces of the sheet and the processing of said second processing means to print the images on the one-side surface of the sheet.

34. An image processing method in an image processing apparatus having first processing means for outputting image data input from an external apparatus and second processing means for outputting another image data different from the image data of the first processing means, said method comprising the step of confirming whether or not the processing by the first processing means shall be executed, to the external apparatus, in a case where there is a request for the processing by the first processing means during the execution of the processing by the second processing means.

35. A method according to claim 34, wherein for the confirmation, when there is an instruction to interrupt the processing by said second processing means and to execute the processing by said first processing means, the processing by said second processing means is temporarily interrupted, the processing by said first processing means is executed, and after completion of the processing by said first processing means, the interrupted processing by said second processing means is restarted.

36. A method according to claim 34, wherein for the confirmation by said confirming means, when there is an instruction to alternately execute the processing by said second processing means and the processing by said first processing means, the processing by said second processing means and the processing by said first processing means are switched each time a predetermined processing is executed.

37. An image processing apparatus comprising:

input means for inputting image data;

output means for outputting the image data input by said input means;

processing means for processing a job to output the image data by said output means;

first detecting means for detecting a processing stage of a current job processed by said processing means;

second detecting means for detecting a condition of another job to be executed by said processing means by interruption of the current job; and judging means for judging whether operations to interrupt the current job and to execute the other job shall be permitted or inhibited on the basis of a first detection result of said first detecting means and a second detection result of said second detecting means.

38. An image processing apparatus comprising:

input means for inputting image data;

output means for outputting the image data input by said input means;

processing means for processing a job to output the image data by said output means;

first detecting means for detecting a processing stage of the job processed by said processing means; and confirming means for confirming whether or not the job is to be executed in a case where there is a request for executing the job during the processing of another job, said confirming means further comprising requirement means for requiring an instruction for the execution of the job or the other job.

39. An image processing apparatus comprising:

input means for inputting image data;

output means for outputting the image data input by said input means;

processing means for processing a job to output the image data by said output means;

detecting means for detecting a condition of a current job processed by said processing means; and control means for changing, in accordance with a detection result obtained by said detecting means, a processing condition of another job, the other job being executable by interrupting the current job.

40. An image processing apparatus comprising:

input means for inputting image data;

output means for outputting the image data input by said input means;

processing means for processing a job to output the image data by said output means; and confirming means for confirming whether or not the job is to be processed to an external terminal, in a case where there is a request, from the external terminal, for processing the job during the processing of another job.

41. A computer readable program, stored in a storage medium, for controlling an image processing apparatus, said program comprising:

an input step of inputting image data to the image processing apparatus;

a processing step of outputting the image data, input in said input step, from output means of the image processing apparatus;

a first detecting step of detecting a processing stage of a current job processed by the image processing apparatus in accordance with said processing step;

a second detecting step of detecting a condition of another job to be executed by interruption of the current job by the image processing apparatus in accordance with said processing step; and a judging step of judging whether operations to interrupt the current job and to execute the other job shall be permitted or inhibited on the basis of a first detection result obtained by said first detecting step and a second detection result obtained by said second detecting step.

42. A computer readable program, stored in a storage medium, for controlling an image processing apparatus, said program comprising:

an input step of inputting image data to the image processing apparatus;

a recording step of recording the image data input in said input step on a recording sheet by a printer of the image processing apparatus; and a judging step of judging whether operations, which interrupt the current job for recording the image data by the printer and execute another job, shall be permitted or inhibited, wherein said judging step permits interruption in a case where no sheet is stored in a storage means for storing recording sheets of the image processing apparatus and in a case where the recording by the printer is not performed.

43. A computer readable program, stored in a storage medium, for controlling an image processing apparatus, said program comprising:

an input step of inputting image data to the image processing apparatus;

a processing step of outputting the image data, input in said input step, from output means of the image processing apparatus; and a confirming step of confirming by the image processing apparatus whether or not a job is to be executed in a case where there is a request for executing the job during the execution of another job, said confirming step further comprising a step of requiring an instruction for the execution of the job or the other job.

44. A computer readable program, stored in a storage medium, for controlling an image processing apparatus, said program comprising:

an input step of inputting image data to the image processing apparatus;

a processing step of outputting the image data, input in said input step, from output means of the image processing apparatus; and a detecting means of detecting a condition of a current job processed by the image processing apparatus in accordance with said processing step; and a control step of changing, in accordance with a detection result in said detecting step, a processing condition of another job, the other job being executable by interrupting the current job.

45. A computer readable program, stored in a storage medium, for controlling an image processing apparatus, said program comprising:

an input step of inputting image data to the image processing apparatus;

a processing step of outputting the image data, input in said input step, from output means of the image processing apparatus; and a confirming step of confirming by the image processing apparatus whether or not a job is to be processed to an external terminal in a case where there is a request from the external terminal for processing the job during the processing of another job.

* * * * *

UNITED STATES PATENT AND TRADEMARK OFFICE
CERTIFICATE OF CORRECTION

PATENT NO. : 5,812,907

DATED : September 22, 1998

INVENTOR(S): AKIO ITOH ET AL.

It is certified that error appears in the above-identified patent and that said Letters Patent is hereby corrected as shown below:

COLUMN 1

Line 17, "transmitted" should read --transmitted,--;
Line 24, "compete during" should read --compete in--;
Line 25, "in" should read --during--;
Line 26, "an" (first occurrence) should be deleted;
Line 27, "in" should be deleted;
Line 28, "executing" should be deleted;
Line 30, "of" should be deleted;
Line 39, "a" should be deleted;
Line 40, "of" should be deleted.

COLUMN 2

Line 31, "comprised" should read --comprises--;
Line 43, "comprised" should read --comprises--;
Line 48, "an" should read --a--;
Line 49, "cross sectional" should read --cross-sectional--;
Line 59, "cross sectional" should read --cross-sectional--.

COLUMN 11

Line 27, "basis" should read --basis of--.

UNITED STATES PATENT AND TRADEMARK OFFICE
CERTIFICATE OF CORRECTION

PATENT NO. : 5,812,907

DATED : September 22, 1998

INVENTOR(S): AKIO ITOH ET AL.

It is certified that error appears in the above-identified patent and that said Letters Patent is hereby corrected as shown below:

<u>COLUMN 18</u>

Line 42, "inputted" should read --inputted in--.

Signed and Sealed this

Fifteenth Day of June, 1999

*Attest:*

Q. TODD DICKINSON

*Attesting Officer*     *Acting Commissioner of Patents and Trademarks*